United States Patent
Murakami

(10) Patent No.: US 12,068,688 B2
(45) Date of Patent: Aug. 20, 2024

(54) SWITCHING POWER SUPPLY DEVICE

(71) Applicant: Rohm Co., Ltd., Kyoto (JP)

(72) Inventor: Kazuhiro Murakami, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 224 days.

(21) Appl. No.: 17/791,017

(22) PCT Filed: Dec. 11, 2020

(86) PCT No.: PCT/JP2020/046316
§ 371 (c)(1),
(2) Date: Jul. 6, 2022

(87) PCT Pub. No.: WO2021/140833
PCT Pub. Date: Jul. 15, 2021

(65) Prior Publication Data
US 2023/0046982 A1     Feb. 16, 2023

(30) Foreign Application Priority Data

Jan. 9, 2020    (JP) .................................. 2020002367

(51) Int. Cl.
*H02M 3/158*     (2006.01)
*H02M 1/00*     (2006.01)
*H02M 3/156*     (2006.01)

(52) U.S. Cl.
CPC ......... *H02M 3/158* (2013.01); *H02M 1/0009* (2021.05); *H02M 3/1566* (2021.05)

(58) Field of Classification Search
CPC .. H02M 3/158; H02M 3/1582; H02M 3/1586; H02M 3/157; H02M 3/156; H02M 3/1566; H02M 1/0009; H02M 1/0003
See application file for complete search history.

(56) References Cited

U.S. PATENT DOCUMENTS

| | | | | |
|---|---|---|---|---|
| 11,018,584 | B2* | 5/2021 | Ruan ..................... | H02M 3/157 |
| 2009/0322299 | A1* | 12/2009 | Michishita ............ | H02M 3/156 323/282 |
| 2012/0126772 | A1 | 5/2012 | Yamakoshi et al. | |
| 2020/0136516 | A1* | 4/2020 | Chesneau ............. | H02M 3/158 |

FOREIGN PATENT DOCUMENTS

JP     2012114987     6/2012

OTHER PUBLICATIONS

PCT International Search Report in International Appln. No. PCT/JP2020/046316, dated Feb. 2, 2021, 5 pages (with English Translation).

\* cited by examiner

*Primary Examiner* — Nguyen Tran
(74) *Attorney, Agent, or Firm* — Fish & Richardson P.C.

(57) ABSTRACT

In a switching power supply device, a comparison voltage is generated based on a feedback voltage commensurate with the output voltage. Synchronously with the output transistor being turned on, a ramp voltage is made to start increasing from a first initial voltage; when the ramp voltage exceeds the comparison voltage, the output transistor is turned off. When the switching frequency is lowered from a first frequency to a second frequency, it is switched to the second frequency after the lapse of a transition period. During the transition period, the ramp voltage is made to start increasing from a second initial voltage (>first initial voltage).

14 Claims, 19 Drawing Sheets

PWM CONTROL

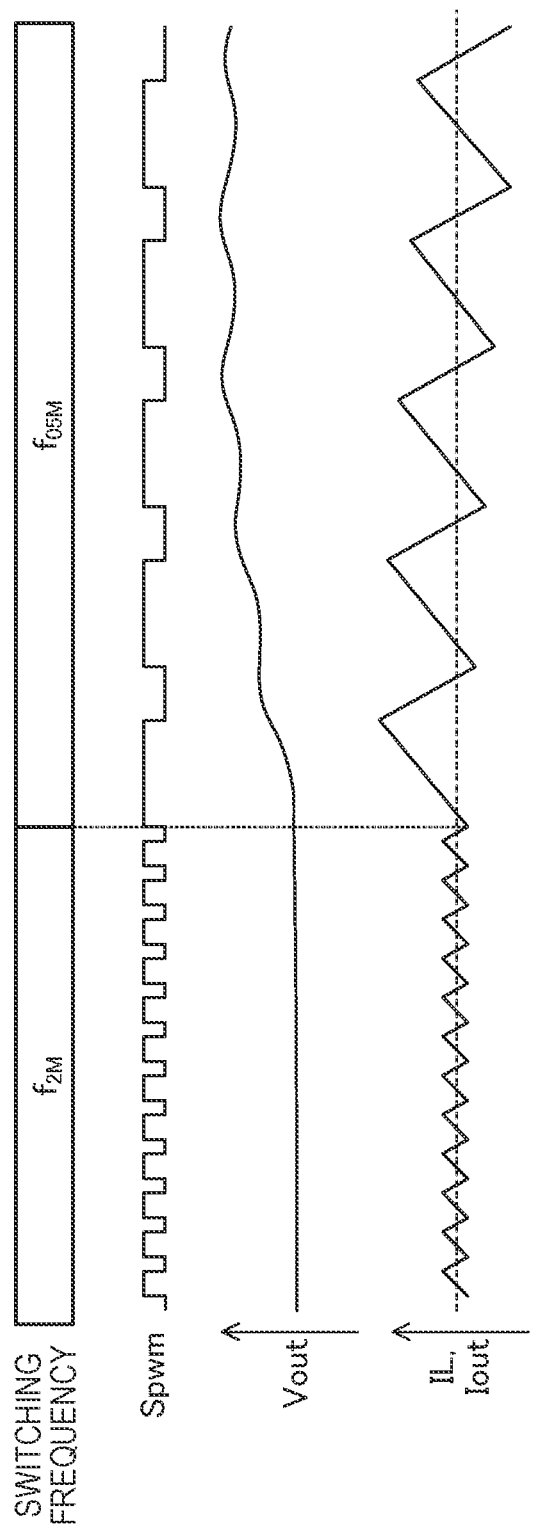

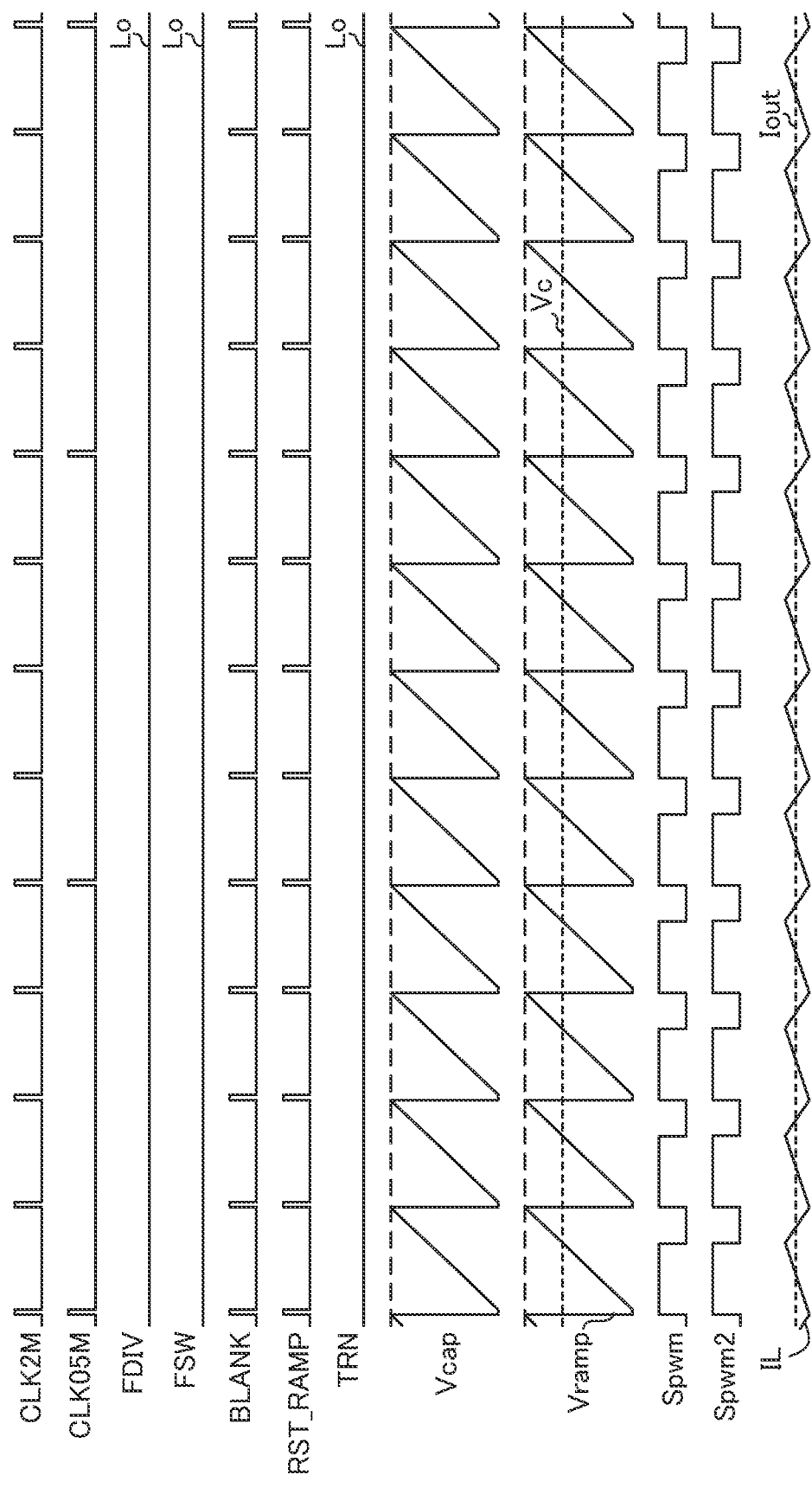

SWITCHING POWER SUPPLY DEVICE

TECHNICAL FIELD

The present disclosure relates to switching power supply devices.

BACKGROUND ART

FIG. 23 shows the configuration of a switching power supply device 900 according to a reference technology. The switching power supply device 900 is a buck (step-down) switching power supply device that generates an output voltage Vo from an input voltage Vi. The switching power supply device 900 includes an output stage circuit 910 composed of an output transistor 911 on the high side and a synchronous rectification transistor 912 on the low side. The switching power supply device 900 makes the output stage circuit 910 perform switching operation by feeding the transistors 911 and 912 with gate signals GH and GL based on a feedback voltage commensurate with the output voltage Vo, and thereby stabilizes the output voltage Vo at a desired target voltage (see, for example, Patent Document 1 identified below).

In the switching power supply device 900, as the voltage difference between the input voltage Vi and the output voltage Vo decreases, the duty (duty factor) of the output stage circuit 910 (i.e., the on-duty of the output transistor 911) increases. On the other hand, the duty of the output stage circuit 910 is subject to an upper limit, and the off-period of the output transistor 911 in each period is required to be equal to or more than a lower-limit time (e.g., 50 nanoseconds). While a decrease in the above-mentioned voltage difference brings a decrease in the off-period of the output transistor 911 in each period, when the above-mentioned voltage difference becomes so small that, even if the duty of the output stage circuit 901 is raised up to the upper limit (in other words, even if the off-period of the output transistor 911 is reduced down to the lower-limit time), the output voltage Vo is difficult to keep at the target voltage, then, as shown in FIG. 24, a pulse in the gate signal GH is coupled to the pulse in the next period and thereby the switching frequency is lowered (this method will be referred to as the reference method).

The drop in the switching frequency inherent with the reference method raises the upper limit of the duty of the output stage circuit 910 compared with that before the drop in the switching frequency, and this makes it possible to keep the output voltage Vo at or as close as possible to the target voltage despite the small voltage difference between the input voltage Vi and the output voltage Vo.

CITATION LIST

Patent Literature

Patent Document 1: JP-A-2012-114987

Technical Problem

Inconveniently, with the reference method, it is difficult to manage and control the switching frequency in a desirable manner, possibly leading to switching being performed at a frequency that is inappropriate for the appliance that incorporates the switching power supply device 900. For example, in a situation where switching needs to be performed basically at 2 MHz (megahertz), coupling pulses as mentioned above causes the switching frequency to fall to 1 MHz. On the other hand, in vehicle onboard applications, there are strict requirements against noise in the AM frequency band, namely from about 550 kHz to about 1.8 MHz, and switching at 1 MHz may not be permissible.

According to one possible solution, for example, while switching is performed basically at 2 MHz (megahertz), whenever the switching frequency needs to be lowered, it is lowered from 2 MHz to 500 kHz. However, simply switching the switching frequency may cause, when it is switched, an undesirable variation in the output voltage. This will be discussed in detail later.

While operation related to the switching of a switching frequency has been discussed with focus on the AM frequency band in vehicle onboard applications, also in applications other than vehicle onboard applications and in frequency bands other than the AM frequency band, similar circumstances may arise.

An object of the present disclosure is to provide a switching power supply device capable of appropriate switching of a switching frequency (e.g., capable of suppressing a variation in the output voltage during the switching of the switching frequency).

Solution to Problem

According to one aspect of the present disclosure, a buck switching power supply device includes: an output stage circuit including an output transistor between an application terminal for an input voltage and a predetermined switching terminal and a rectification element between the switching terminal and a reference potential point at a predetermined reference potential; and a main control circuit configured to generate an output voltage by making the output stage circuit perform switching operation at a predetermined switching frequency. A coil is provided between the switching terminal and an application terminal for the output voltage, and an output capacitor is provided between the application terminal for the output voltage and the reference potential point. The main control circuit includes: a comparison voltage generator configured to generate a comparison voltage based on a feedback voltage commensurate with the output voltage; a ramp voltage generator configured to generate a ramp voltage of which the voltage value changes linearly in a predetermined direction during each period at the switching frequency; a PWM comparator configured to compare the comparison voltage with the ramp voltage to output a signal indicating the result of comparison; and a controller configured to control the state of the output stage circuit based on the output signal of the PWM comparator. In each period at the switching frequency, the controller turns on the output transistor and the ramp voltage generator makes the ramp voltage start to change in the predetermined direction starting at a predetermined first initial voltage, and thereafter, when the ramp voltage changes until a reversal occurs in the magnitude relationship between the ramp voltage and the comparison voltage, the controller turns off the output transistor. The main control circuit can switch the switching frequency between a predetermined first frequency and a second frequency lower than the first frequency. When switching the switching frequency from the first frequency to the second frequency, the main control circuit sets a transition period shorter than the reciprocal of the second frequency and switches the switching frequency to the second frequency after the lapse of the transition period. In the transition period, the controller turns on the output transistor and the ramp voltage generator makes the ramp voltage start to change in the predetermined direction starting at a second initial voltage further in the predetermined direction than the first initial voltage, and thereafter, when the ramp voltage changes until a reversal occurs in the magnitude relationship between the ramp voltage and the comparison voltage, the controller turns off the output transistor. (A first configuration.)

In the switching power supply device of the first configuration described above, the gradient of change (variation) of the ramp voltage may be proportional to the switching frequency, and the gradient of change of the ramp voltage during the transition period may be equal to the gradient of change of the ramp voltage with the switching frequency set to the second frequency. An offset voltage, which is the difference between the first and second initial voltages, may correspond to the voltage resulting from multiplying by a predetermined coefficient less than one the amount of change of the ramp voltage during one period with the switching frequency set to the second frequency. (A second configuration.)

In the switching power supply device of the second configuration described above, the predetermined coefficient may be determined according to the ratio between the first and second frequencies. (A third configuration.)

In the switching power supply device of the second or third configuration described above, the ramp voltage generator may include: a ramp node at which the ramp voltage appears; a current source configured to generate a ramp current; a ramp capacitor configured to receive the ramp current to store electric charge attributable to it during each period at the switching frequency; an offset resistor between the ramp capacitor and the ramp node; and a short-circuiting switch in parallel with the offset resistor. The terminal-to-terminal voltage across the ramp capacitor may be set to the first initial voltage at the timing of the start of each period at the switching frequency and at the timing of the start of the transition period. The short-circuiting switch may be off only during the transition period, and turning off the short-circuiting switch results in the offset voltage appearing across the offset resistor. (A fourth configuration.)

In the switching power supply device of the fourth configuration described above, the ramp current may be proportional to the switching frequency, and the value of the ramp current during the transition period may be equal to the value of the ramp current with the switching frequency set to the second frequency. (A fifth configuration.)

In the switching power supply device of any of the first to fifth configurations described above, the main control circuit may further include: a clock signal generator configured to generate a first clock signal at the first frequency and a second clock signal at the second frequency that are synchronous with each other. The main control circuit may make the output stage circuit perform switching operation in synchronization with the first or second clock signal to make the switching frequency the first or second frequency respectively, and may set the length of the transition period to an integer times the period of the first clock signal. (A sixth configuration.)

In the switching power supply device of any of the first to sixth configurations described above, when switching the switching frequency from the second frequency to the first frequency, the main control circuit may set a second transition period shorter than the reciprocal of the second frequency, and may switch the switching frequency to the first frequency after the lapse of the second transition period. In the second transition period, the controller may turn on the output transistor and the ramp voltage generator may make the ramp voltage start to change in the predetermined direction starting at the first initial voltage, and thereafter, simultaneously with the end of the second transition period, the main control circuit may turn the ramp voltage back to the first initial voltage to start switching operation at the second frequency. (A seventh configuration.)

In the switching power supply device of the seventh configuration described above, when the switching frequency is switched from the second frequency to the first frequency, a coil current through the coil may increase during the second transition period, and starting at the coil current so increased, switching operation at the second frequency may be started. (An eighth configuration.)

In the switching power supply device of any of the first to eighth configurations described above, the main control circuit may set the switching frequency based on the ratio of the output voltage to the input voltage. (A ninth configuration.)

In the switching power supply device of the ninth configuration described above, while the main control circuit is performing switching operation at the first frequency, when the ratio of the output voltage to the input voltage changes from lower to higher than a predetermined first threshold value, the main control circuit may switch the switching frequency from the first frequency to the second frequency and thereafter, when the ratio of the output voltage to the input voltage changes from higher to lower than a predetermined second threshold value, the main control circuit may switch the switching frequency from the second frequency to the first frequency. The second threshold value may be lower than the first threshold value. (A tenth configuration.)

In the switching power supply device of any of the first to tenth configurations described above, the first frequency may be an integer times the second frequency. (An eleventh configuration.)

In the switching power supply device of any of the first to sixth configurations described above, the first frequency may be four times the second frequency, and the length of the transition period may be three times the reciprocal of the first frequency. (A twelfth configuration.)

In the switching power supply device of the seventh or eighth configuration described above, the first frequency may be four times the second frequency, the length of the transition period may be three times a reciprocal of the first frequency, and the length of the second transition period may be equal to the reciprocal of the first frequency. (A thirteenth configuration.)

In the switching power supply device of any of the first to thirteenth configurations described above, the rectification element may be a synchronous rectification transistor and, in switching operation of the output stage circuit, the output transistor and the synchronous rectification transistor may be turned on and off alternately. (A fourteenth configuration.)

Advantageous Effects of Disclosure

According to the present disclosure, it is possible to provide a switching power supply device capable of appropriate switching of a switching frequency (e.g., capable of suppressing a variation in the output voltage during the switching of the switching frequency).

BRIEF DESCRIPTION OF DRAWINGS

FIG. 8 is a diagram illustrating first imaginary switching operation;

FIG. 17 is a timing chart of the switching power supply device according to the first embodiment of the present disclosure (Case CS1);

DESCRIPTION OF EMBODIMENTS

Figure 1:
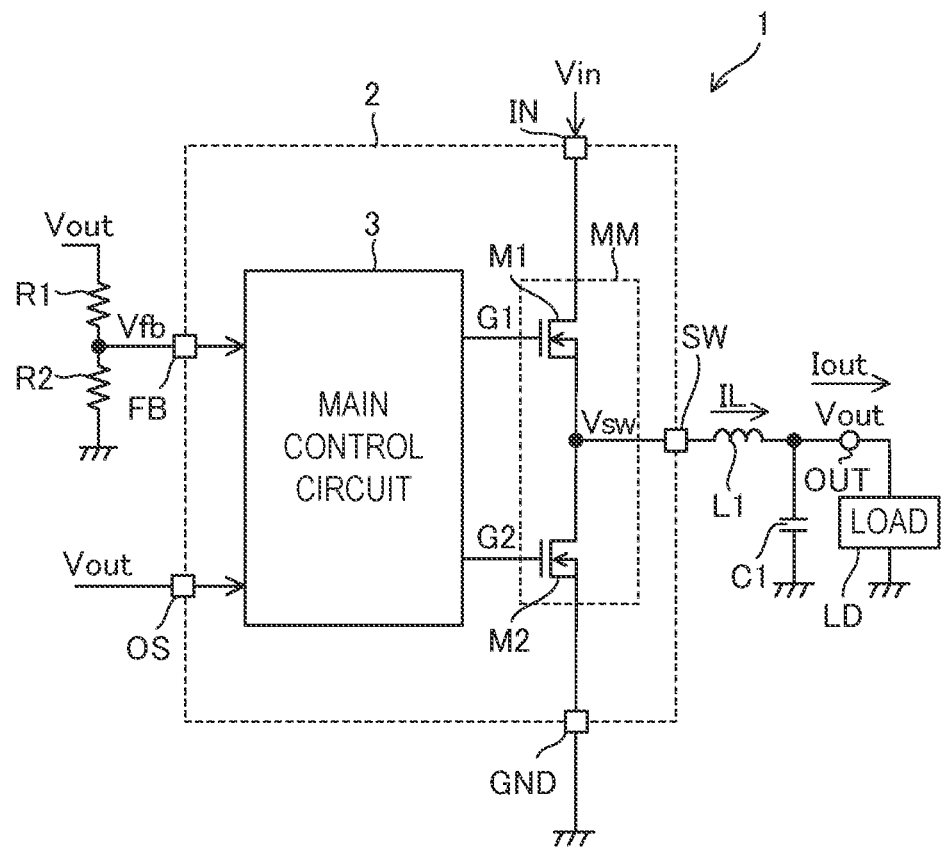
FIG. 1 is a schematic overall configuration diagram of a switching power supply device according to a first embodiment of the present disclosure.

Hereinafter, examples of implementing the present disclosure will be described specifically with reference to the accompanying drawings. Among the diagrams referred to in the course, the same parts are identified by the same reference signs, and in principle no overlapping description of the same parts will be repeated. In the present description, for the sake of simplicity, symbols and reference signs referring to information, signals, physical quantities, elements, parts, and the like are occasionally used with omission or abbreviation of the names of the information, signals, physical quantities, elements, parts, and the like corresponding to those symbols and reference signs. For example, the frequency switch signal described later and identified by the reference sign "FDIV" (see FIG. 3) is sometimes referred to as the frequency switch signal FDV and other times abbreviated to the signal FDIV, both referring to the same entity.

First, some of the terms used to describe embodiments of the present disclosure will be defined. "IC" is an abbreviation of "integrated circuit". "Ground" refers to an electrically conductive part at a reference potential of 0 V (zero volts) (i.e., a reference potential point), or to a potential of 0 V itself. A potential of 0 V is occasionally referred to as a ground potential. In embodiments of the present disclosure, any voltage mentioned with no particular reference mentioned is a potential relative to the ground.

"Level" denotes the level of a potential, and for any signal or voltage, "high level" has a higher potential than "low level". For any signal or voltage, its being at high level means its level being equal to high level, and its being at low level means its level being equal to low level. A level of a signal is occasionally referred to as a signal level, and a level of a voltage is occasionally referred to as a voltage level. For any signal of interest, when the signal of interest is at high level, the inversion signal of that signal of interest is at low level; when the signal of interest is at low level, the inversion signal of that signal of interest is at high level.

For any signal or voltage, a transition from low level to high level is termed an up edge, and the timing of a transition from low level to high level is termed an up-edge timing. Likewise, for any signal or voltage, a transition from high level to low level is termed a down edge, and the timing of a transition from high level to low level is termed a down-edge timing.

For any transistor configured as an FET (field-effect transistor), which can be a MOSFET, "on state" refers to a state where the drain-source channel of the transistor is conducting, and "off state" refers to a state where the drain-source channel of the transistor is not conducting (cut off). Similar definitions apply for any transistor that is not classified as an FET. Unless otherwise stated, any MOSFET can be understood to be an enhancement MOSFET. "MOSFET" is an abbreviation of "metal-oxide-semiconductor field-effect transistor".

Any switch can be configured with one or more FETs (field-effect transistors). When a given switch is in the on state, the switch conducts across its terminals; when a given switch is in the off state, the switch does not conduct across its terminals.

For any transistor or switch, its being in the on or off state is occasionally expressed simply as its being on or off respectively. For any transistor or switch, its switching from the off state to the on state is expressed as a turning-on, and its switching from the on state to the off state is expressed as a turning-off.

For any transistor or switching element, a period in which it is in the on state is occasionally referred to as an on period, and a period in which it is in the off state is occasionally referred to as an off period. For any signal that takes as its signal level high level or low level, a period in which the signal is at high level is referred to as a high-level period and a period in which the signal is at low level is referred to as a low-level period. The same applies to any voltage that takes as its voltage level high level or low level.

First Embodiment

A first embodiment of the present disclosure will be described. FIG. 1 is a schematic overall configuration diagram of a switching power supply device 1 according to the first embodiment of the present disclosure. The switching power supply device 1 in FIG. 1 includes a switching power supply IC 2, which is a switching power supply circuit (switching power supply semiconductor device), and a plurality of discrete components that are externally connected to the switching power supply IC 2. The discrete components include a capacitor C1 as an output capacitor, resistors R1 and R2 as feedback resistors, and a coil L1. The switching power supply device 1 is configured as a buck (step-down) switching power supply device (DC-DC converter) that generates a desired output voltage Vout from an input voltage Vin supplied from the outside. The output voltage Vout appears at an output terminal OUT. That is, the output terminal OUT is an application terminal for the output voltage Vout (i.e., the terminal to which the output voltage Vout is applied). The output voltage Vout is supplied to a load LD connected to the output terminal OUT. The input voltage Vin and the output voltage Vout are each a positive direct-current voltage, and the output voltage Vout is lower than the input voltage Vin. For example, in an application where the input voltage Vin is 12 V, adjusting the resistance values of the resistors R1 and R2 permits the output voltage Vout to be stabilized at a desired positive voltage value (e.g., 3.3 V or 5 V) lower than 12 V. The current that flows through the load LD via the output terminal OUT will be referred to as the output current Iout.

Figure 2:
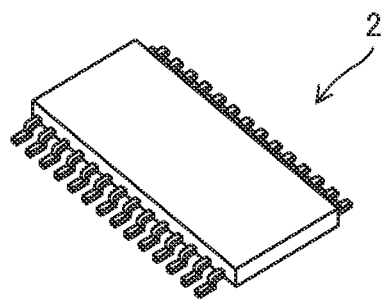
FIG. 2 is an exterior perspective view of a switching power supply IC according to the first embodiment of the present disclosure.

The switching power supply IC 2 is, as shown in FIG. 2, an electronic component produced by sealing a semiconductor integrated circuit in a package formed of resin. The package of the IC 2 is provided with a plurality of external terminals exposed out of it. These external terminals include an input terminal IN, a switching terminal SW, a feedback terminal FB, an output monitor terminal OS, and a ground terminal GND, which are shown in FIG. 1. The external terminals may include any other terminals. It should be noted that the number of external terminals on, and the exterior appearance of, the IC 2 as shown in FIG. 2 are merely illustrative.

The configuration outside the switching power supply IC 2 will be described. From outside the IC 2, the input voltage Vin is supplied to the input terminal IN. Between the switching terminal SW and the output terminal OUT, the coil L1 is provided in series. That is, one terminal of the coil L1 is connected to the switching terminal SW, and the other terminal of the coil L1 is connected to the output terminal OUT. The output terminal OUT is connected to one terminal of the capacitor C1, and the other terminal of the capacitor C1 is connected to the ground. Thus, the output voltage Vout is applied across the capacitor C1. The output terminal OUT is connected also to one terminal of the resistor R1, and the other terminal of the resistor R1 is connected via the resistor R2 to the ground. The connection node between the resistors R1 and R2 is connected to the feedback terminal FB. The output monitor terminal OS is fed with the output voltage Vout, and the ground terminal GND is connected to the ground. The current that flows through the coil L1 will be referred to as the coil current IL.

The configuration inside the switching power supply IC 2 will be described. The switching power supply IC 2 includes an output stage circuit MM and a main control circuit 3 for controlling it.

The output stage circuit MM includes transistors M1 and M2 each configured as an N-channel MOSFET (metal-oxide-semiconductor field-effect transistor). The transistors M1 and M2 are a pair of switching elements that are connected in series between the input terminal IN and the ground terminal GND (in other words, the ground), and as they are driven to perform switching, the input voltage Vin is switched such that a switching voltage Vsw with a rectangular waveform appears at the switching terminal SW. The transistor M1 is provided on the high side, and the transistor M2 is provided on the low side. Specifically, the drain of the transistor M1 is connected to the input terminal IN, which is an application terminal for the input voltage Vin, and the source of the transistor M1 and the drain of the transistor M2 are both connected to the switching terminal SW. The source of the transistor M2 is connected to the ground. Between the source of the transistor M2 and the ground, a resistor for current sensing may be inserted.

The transistor M1 functions as an output transistor, and the transistor M2 functions as a synchronous rectification transistor. The coil L1 and the capacitor C1 constitute a rectification/smoothing circuit that rectifies and smooths the switching voltage Vsw with a rectangular waveform appearing at the switching terminal SW and that thereby produces the output voltage Vout. The resistors R1 and R2 constitute a voltage division circuit that divide the output voltage Vout, and at the connection node between the resistors R1 and R2 appears a feedback voltage Vfb, which is a division voltage of the output voltage Vout. With the connection node between the resistors R1 and R2 connected to the feedback terminal FB, the feedback voltage Vfb is fed to the feedback terminal FB.

The gates of the transistors M1 and M2 are fed with, as driving signals, gate signals G1 and G2 respectively, so that the transistors M1 and M2 are turned on and off according to the gate signals G1 and G2. When the gate signal G1 is at high level, the transistor M1 is in the on state; when the gate signal G1 is at low level, the transistor M1 is in the off state. Likewise, when the gate signal G2 is at high level, the transistor M2 is in the on state; when the gate signal G2 is at low level, the transistor M2 is in the off state. The transistors M1 and M2 are basically turned on and off alternately, though there are periods in which the transistors M1 and M2 are both kept in the off state. That is, the output stage circuit MM is in one of a high-output state, a low-output state, and a Hi-Z state at a time. In the high-output state, the transistors M1 and M2 are in the on and off states respectively. In the low-output state, the transistors M1 and M2 are in the off and on states respectively. In the Hi-Z state, the transistors M1 and M2 are both in the off state. It never occurs that the transistors M1 and M2 are both in the on state. In the following description, unless necessary, the Hi-Z state will be ignored and it is assumed that the output stage circuit MM is either in the high-output state or in the low-output state at a time.

The main control circuit 3 controls the on/off states of the transistors M1 and M2 individually by controlling the levels of the gate signals G1 and G2 based on the feedback voltage Vfb, and thereby produce, at the output terminal OUT, the output voltage Vout commensurate with the feedback voltage Vfb. Moreover, as shown in FIG. 1, the main control circuit 3 is fed with the output voltage Vout. The main control circuit 3 can exercise overvoltage protection and the like based on the output voltage Vout, and can perform any other process by use of the output voltage Vout (details will be given later).

While it is here assumed that synchronous rectification is employed in the output stage circuit MM, diode rectification may instead be employed. When diode rectification is employed, the transistor M2 is omitted from the output stage circuit MM, which is in that case provided instead with a synchronous rectification diode (not illustrated) of which the anode is connected to the ground and of which the cathode is connected to the switching terminal SW (switching operation in the output stage circuit MM will then be achieved with switching operation by the transistor M1 alone). The transistor M2 and the synchronous rectification diode each function as a rectification element that, when the transistor M1 (output transistor) is in the off state, delivers a current based on the energy accumulated in the coil L1 from the ground to the output terminal OUT.

Figure 3:
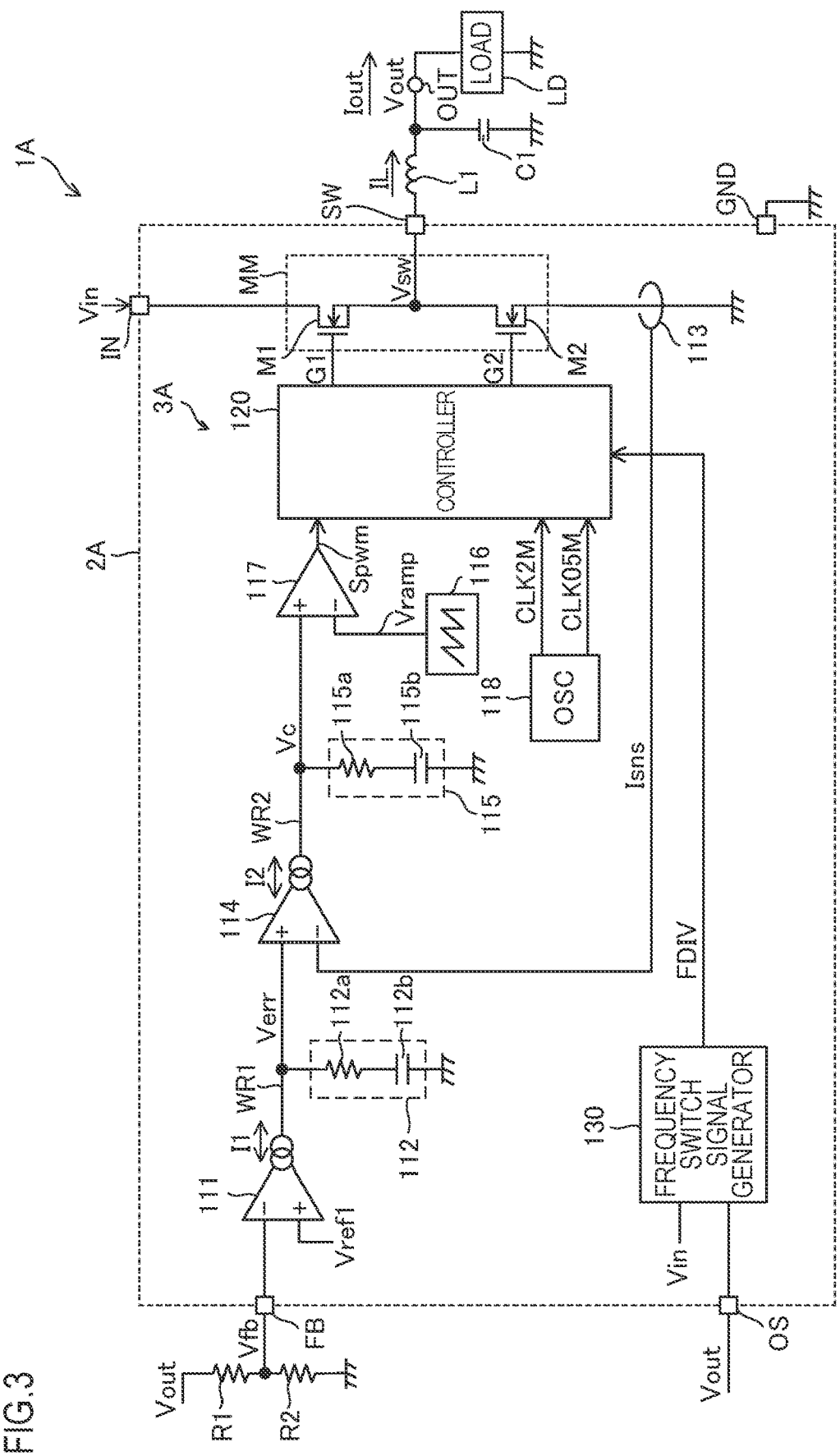
FIG. 3 is an overall configuration diagram of the switching power supply device according to the first embodiment of the present disclosure.

Now, the configuration and operation of the switching power supply device 1 will be described by way of an example where current mode control is employed. FIG. 3 is an overall configuration diagram of a switching power supply device 1A, which is the switching power supply device 1 configured to employ current mode control. The switching power supply device 1A includes, as the switching power supply IC 2, a switching power supply IC 2A. The switching power supply IC 2A includes the output stage circuit MM and, as the main control circuit 3, a main control circuit 3A. Unless inconsistent, all the description of the switching power supply device 1, the switching power supply IC 2, and the main control circuit 3 give above applies to the switching power supply device 1A, switching power supply IC 2A, and the main control circuit 3A as well.

The main control circuit 3A includes an error amplifier 111, a phase compensator 112, a current sensor 113, a differential amplifier 114, a phase compensator 115, a ramp voltage generator 116, a comparator (PWM comparator) 117, an oscillator 118, a controller 120, and a frequency switch signal generator 130.

The error amplifier 111 is a current-output transconductance amplifier. The inverting input terminal of the error amplifier 111 is fed with the voltage applied to the feedback terminal FB (i.e., the feedback voltage Vfb), and the non-inverting input terminal of the error amplifier 111 is fed with a predetermined reference voltage Vref1. The reference voltage Vref1 is a direct-current voltage with a predetermined positive voltage value, and is generated in a reference voltage generation circuit (not illustrated) within the IC 2A. The error amplifier 111 outputs from its output terminal an error current signal I1 according to the difference between the feedback voltage Vfb and the reference voltage Vref1. Electric charge attributable to the error current signal I1 is fed into and out of a wiring conductor WR1, which is a wiring conductor for an error signal. Specifically, when the feedback voltage Vfb is lower than the reference voltage Vref1, the error amplifier 111 outputs a current attributable to the error current signal I1 from the error amplifier 111 toward the wiring conductor WR1 so that the potential on the wiring conductor WR1 will rise; when the feedback voltage Vfb is higher than the reference voltage Vref1, the error amplifier 111 extracts a current attributable to the error current signal I1 from the wiring conductor WR1 toward the error amplifier 111 so that the potential on the wiring conductor WR1 will fall. As the absolute value of the difference between the feedback voltage Vfb and the reference voltage Vref1 increases, the magnitude of the current attributable to the error current signal I1 increases.

The phase compensator 112 is provided between the wiring conductor WR1 and the ground. The phase compensator 112 receives the error current signal I1 to generate an error voltage Verr on the wiring conductor WR1. The phase compensator 112 is provided to compensate the phase of the error voltage Verr. The phase compensator 112 includes a series circuit composed of a resistor 112a and a capacitor 112b. Specifically, one terminal of the resistor 112a is connected to the wiring conductor WR1, and the other terminal of the resistor 112a is connected via the capacitor 112b to the ground. By appropriately setting the resistance value of the resistor 112a and the capacitance value of the capacitor 112b, it is possible to compensate the phase of the error voltage Verr to prevent oscillation of the output feedback loop.

The current sensor 113 samples the coil current IL through the coil L1 with predetermined timing to output a current sense signal Isns that indicates the value of the so sampled coil current IL. The current sense signal Isns is a voltage signal, and accordingly the voltage of the current sense signal Isns will occasionally be referred to as the voltage Isns. It is assumed that the polarity of the coil current IL is, when it flows from the switching terminal SW to the output terminal OUT, positive and, when it flows from the output terminal OUT to the switching terminal SW, negative. As the coil current IL changes from the negative side to the negative side, the voltage Isns rises. Accordingly, when the coil current IL is positive, as the magnitude of the coil current IL increases, the voltage Isns rises; when the coil current IL is negative, as the magnitude of the coil current IL increases, the voltage Isns lowers. For example, the current sensor 113 includes a sense resistor provided between the source of the transistor M2 and the ground, and generates the voltage Isns by sampling the voltage drop across the sense resistor during the time period in which the transistor M2 is on. That is, while the coil current IL can be sensed by sensing the current through the transistor M2, the current sensor 113 may be configured to generate the voltage Isns by sensing the current through the transistor M1 or by directly sensing the current through the coil L1.

The differential amplifier 114 is, like the error amplifier 111, a current-output transconductance amplifier. The non-inverting input terminal of the differential amplifier 114 is fed with the error voltage Verr applied to the wiring conductor WR1, and the inverting input terminal of the differential amplifier 114 is fed with the voltage Isns. The differential amplifier 114 outputs from its output terminal a current signal I2 according to the difference between the error voltage Verr and the voltage Isns. Electric charge attributable to the current signal I2 is fed into and out of a wiring conductor WR2. Specifically, when the error voltage Verr is higher than the voltage Isns, the differential amplifier 114 outputs a current attributable to the current signal I2 from the differential amplifier 114 toward the wiring conductor WR2 so that the potential on the wiring conductor WR2 will rise; when the error voltage Verr is lower than the voltage Isns, the differential amplifier 114 extracts a current attributable to the current signal I2 from the wiring conductor WR2 toward the differential amplifier 114 so that the potential on the wiring conductor WR2 will lower. As the absolute value of the difference between the error voltage Verr and the voltage Isns increases, the magnitude of the current attributable to the current signal I2 increases.

The phase compensator 115 is provided between the wiring conductor WR2 and the ground. The phase compensator 115 receives the current signal I2 to generate a comparison voltage Vc on the wiring conductor WR2. The phase compensator 115 is provided to compensate the phase of the comparison voltage Vc. The phase compensator 115 includes a series circuit composed of a resistor 115a and a capacitor 115b. Specifically, one terminal of the resistor 115a is connected to the wiring conductor WR2, and the other terminal of the resistor 115a is connected via the capacitor 115b to the ground. By appropriately setting the resistance value of the resistor 115a and the capacitance value of the capacitor 115b, it is possible to compensate the phase of the comparison voltage Vc to prevent oscillation of the output feedback loop.

Figure 4:
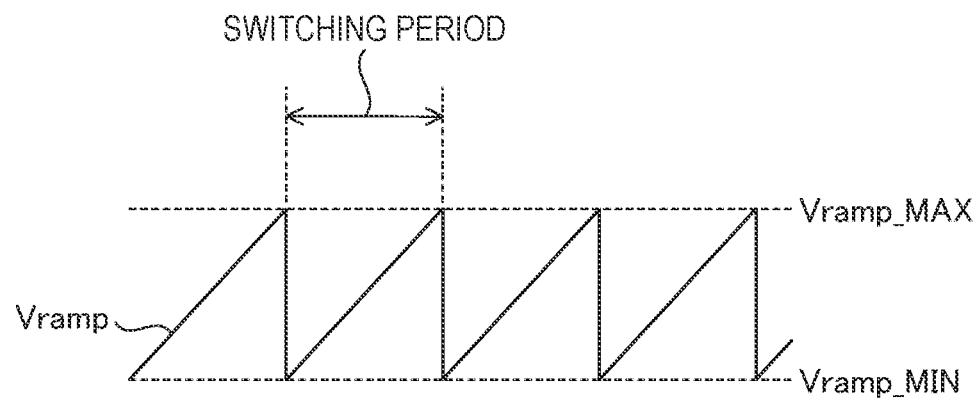
FIG. 4 is a diagram showing the relationship between a ramp voltage and a switching period according to the first embodiment of the present disclosure.

The ramp voltage generator 116 generates a ramp voltage Vramp of which the voltage value changes linearly in a predetermined direction during each period at a predetermined switching frequency. That is, during each period at a predetermined switching frequency, as time passes, the voltage value of the ramp voltage Vramp changes linearly in a predetermined direction. It is here assumed that the predetermined direction is the increasing direction. The period of the change of the ramp voltage Vramp is equal to the reciprocal of the switching frequency, and that period will be referred to specifically as the switching period. Here, it is assumed that, as shown in FIG. 4, during one switching period, the ramp voltage Vramp, starting at a lower-limit voltage value Vramp_MIN, monotonously increases linearly with time to reach, immediately before the end of that switching period, a higher-limit voltage value Vramp_MAX and then instantaneously returns to the lower-limit voltage value Vramp_MIN. Here, Vramp_MAX>Vramp_MIN.

The non-inverting input terminal of the comparator 117 is fed with the comparison voltage Vc on the wiring conductor WR2, and the inverting input terminal of the comparator 117 is fed with the ramp voltage Vramp from the ramp voltage generator 116. The comparator 117 compares the comparison voltage Vc with the ramp voltage Vramp to output a pulse width modulation signal Spwm that indicates the result of the comparison. The pulse width modulation signal Spwm is at high level during a time period in which the comparison voltage Vc is higher than the ramp voltage Vramp, and is at low level during a time period in which the comparison voltage Vc is lower than the ramp voltage Vramp.

The oscillator 118 (clock signal generator) generates and outputs a clock signal CLK2M, which is a rectangular-wave signal with a predetermined frequency $f_{2M}$, and a clock signal CLK05M, which is a rectangular-wave signal with a predetermined frequency &sm. The frequency $f_{2M}$ is higher than the frequency $f_{O5M}$, and is equal to an integer times the frequency $f_{O5M}$. This embodiment deals with an example where the frequency $f_{2M}$ is 2 MHz (megahertz) and the frequency $f_{O5M}$ is 500 kHz (kilohertz).

Figure 5:
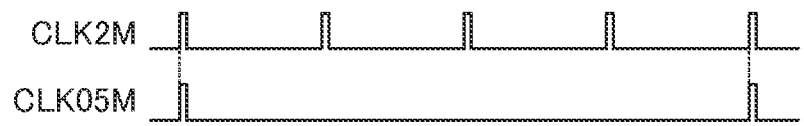
FIG. 5 is a diagram showing the relationship between two clock signals according to the first embodiment of the present disclosure.

FIG. 5 shows the waveforms of the clock signals CLK2M and CLK05M. The clock signal CLK2M is basically at low level and stays at high level for a predetermined minute time periodically, at time intervals equal to the reciprocal of the frequency $f_{2M}$. Accordingly, in the clock signal CLK2M, up edges occur periodically, at time intervals equal to the reciprocal of the frequency $f_{2M}$, and down edges occur periodically, at time intervals equal to the reciprocal of the frequency $f_{2M}$. The clock signal CLK05M is basically at low level and stays at high level for a predetermined minute time periodically, at time intervals equal to the reciprocal of the frequency $f_{O5M}$. Accordingly, in the clock signal CLK05M, up edges occur periodically, at time intervals equal to the reciprocal of the frequency $f_{O5M}$, and down edges occur periodically, at time intervals equal to the reciprocal of the frequency $f_{O5M}$. In the oscillator 118, dividing the frequency of the clock signal CLK2M yields the clock signal CLK05M, and thus the clock signals CLK2M and CLK05M are synchronous with each other. Accordingly, it is assumed that, at the timing that an up edge occurs in the clock signal CLK05M, an up edge occurs also in the clock signal CLK2M and that, at the timing that a down edge occurs in the clock signal CLK05M, a down edge occurs also in the clock signal CLK2M. While the minute time mentioned above may have any length and thus the clock signals CLK2M and CLK05M may have any duty (duty factor), the following description assumes that the minute time is sufficiently short.

The controller 120 controls the state of the output stage circuit MM based on the pulse width modulation signal Spwm from the comparator 117. Specifically, based on the pulse width modulation signal Spwm, the controller 120 generates the gate signals G1 and G2 and feeds these to the gates of the transistors M1 and M2, and thereby makes the output stage circuit MM perform switching operation. In the switching operation, based on the signal Spwm the transistors M1 and M2 are turned on and off alternately. The error amplifier 111 generates the current signal I1 such that the feedback voltage Vfb remains equal to the reference voltage Vref1, with the result that, through the switching operation, the output voltage Vout is stabilized at a predetermined target voltage Vtg according to the reference voltage Vref1 and the ratio of the voltage division by the resistors R1 and R2. The input voltage Vin may have any value, and the target voltage Vtg with respect to the output voltage Vout may have any value. For example, the target voltage Vtg is 3.3 V or 5 V, and the input voltage Vin is 12 V or 24 V. It should however be noted that, as will be mentioned later, the input voltage Vin may vary momentarily.

Figure 6:
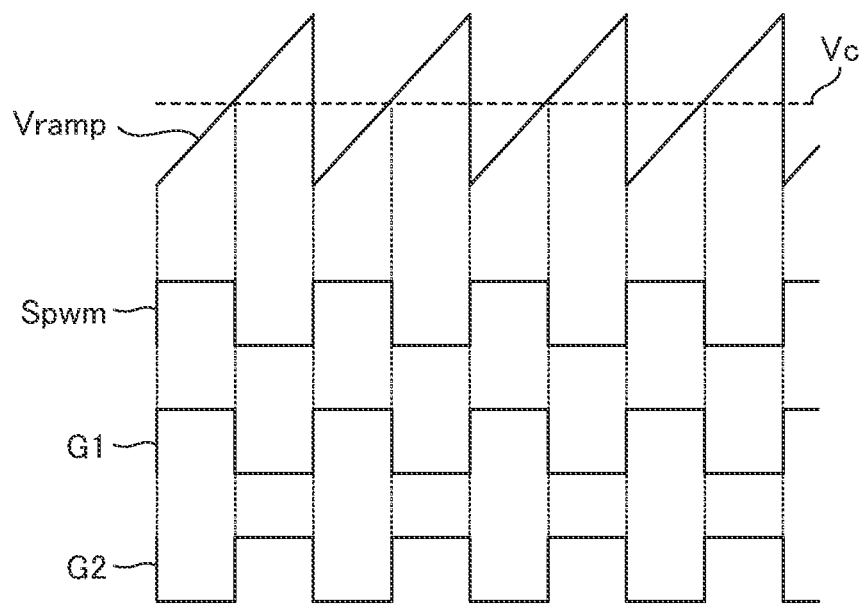
FIG. 6 is a diagram illustrating PWM control according to the first embodiment of the present disclosure.

Basically the comparison voltage Vc remains within the range of variation of the ramp voltage Vramp. So long as the comparison voltage Vc is kept within the range of variation of the ramp voltage Vramp, as shown in FIG. 6, there occur during each switching period a time period in which the signal Spwm is at high level and a time period in which the signal Spwm is at low level, and thus PWM control is performed at the switching frequency. In PWM control, the output stage circuit MM (transistors M1 and M2) performs switching operation at the switching frequency based on reversals in the magnitude relationship between the comparison voltage Vc and the ramp voltage Vramp. That is, in PWM control, the transistors M1 and M2 are turned on and of alternately at the switching period based on the signal Spwm.

Specifically, in PWM control (in switching operation by PWM control), during the high-level period of the signal Spwm, a high-level gate signal G1 and a low-level gate signal G2 are fed to the gates of the transistors M1 and M2 respectively, so that the transistors M1 and M2 are in the on and off states respectively (i.e., the output stage circuit MM is in the high-output state). In the high-output state, a current based on the input voltage Vin flows through the transistor M1 and the coil L1 toward the application terminal for the output voltage Vout (i.e., the output terminal OUT). By contrast, in PWM control (in switching operation by PWM control), during the low-level period of the signal Spwm, a low-level gate signal G1 and a high-level gate signal G2 are fed to the gates of the transistors M1 and M2 respectively, so that the transistors M1 and M2 are in the off and on states respectively (i.e., the output stage circuit MM is in the low-output state). In the low-output state, a current based on the energy accumulated in the coil L1 flows through the transistor M2 and the coil L1. Here, with a view to reliably preventing a through current, a dead time in which the transistors M1 and M2 are both kept in the off state may be inserted between the time period in which the transistor M1 is in the on state and the time period in which the transistor M2 is in the on state.

Based on the input voltage Vin and the output voltage Vout, the frequency switch signal generator 130 generates and outputs a frequency switch signal FDIV for controlling and switching the switching frequency. The frequency switch signal FDIV is fed to the controller 120. While how the frequency switch signal FDIV is generated and used will be described later, based on the frequency switch signal FDIV, the main control circuit 3A switches the switching frequency between the frequencies $f_{2M}$ and $f_{O5M}$.

As described above, the switching power supply device 1A employs current mode control that achieves output feedback control based on both the output voltage Vout and the coil current IL. The voltage Isns according to the coil current IL is fed back to the differential amplifier 114, and the differential amplifier 114 operates such that, as the error voltage Verr rises, the coil current IL increases and that, as the error voltage Verr falls, the coil current IL decreases.

It should be noted that FIG. 3 only shows, out of the components of the switching power supply IC 2A, only those that are material to the present disclosure; that is, the switching power supply IC 2A further includes various other functional blocks that are not shown in FIG. 3. For example, the main control circuit 3A also includes a first clamp circuit (not illustrated) for limiting the variation of the error voltage Verr within a predetermined range and a second clamp circuit (not illustrated) for limiting the variation of the comparison voltage Vc within a predetermined range.

Figure 7A:
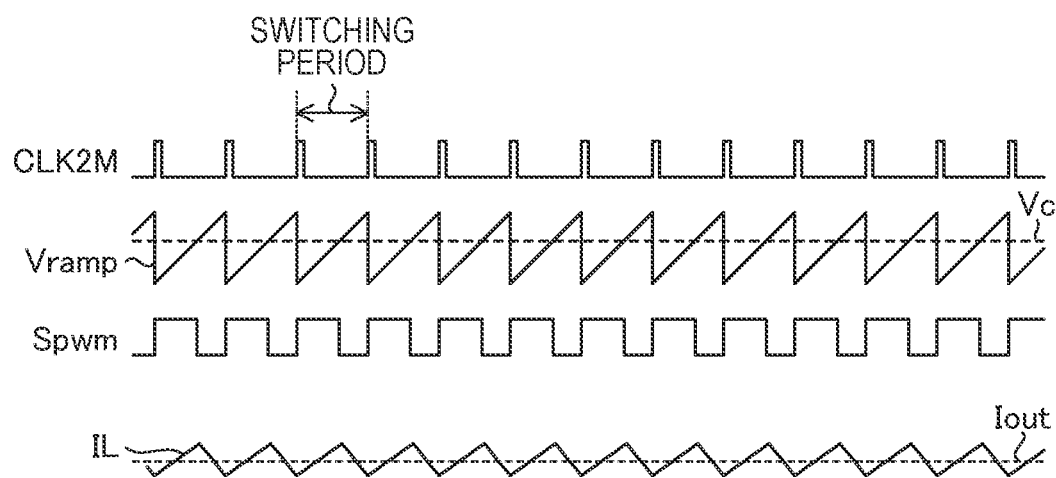
FIGS. 7A and 7B are operation waveform diagrams at switching frequencies of 2 MHz and 500 kHz, respectively, according to the first embodiment of the present disclosure.

FIG. 7A shows the waveforms of the signal CLK2M, the voltages Vramp and Vc, the signal Spwm, the coil current IL, and the output current Iout as observed when the switching frequency is kept stably at the frequency $f_{2M}$. When the switching frequency is the frequency $f_{2M}$, the time interval between two consecutive up edges in the clock signal CLK2M is the switching period, and the main control circuit 3A makes the output stage circuit MM perform switching operation in synchronization with the clock signal CLK2M. Specifically, when the switching frequency is the frequency $f_{2M}$, in synchronization with an up edge in the clock signal CLK2M, an up edge occurs in the signal Spwm, so that the output stage circuit MM is switched to the high-output state (i.e., the transistor M1 is turned on) and simultaneously, starting at the lower-limit voltage value Vramp_MIN (see FIG. 4), the ramp voltage Vramp starts to rise; thereafter, at the timing of a transition from Vramp<Vc to Vramp>Vc, a down edge occurs in the signal Spwm, so that the output stage circuit MM is switched to the low-output state (i.e., the transistor M1 is turned off).

Figure 7B:
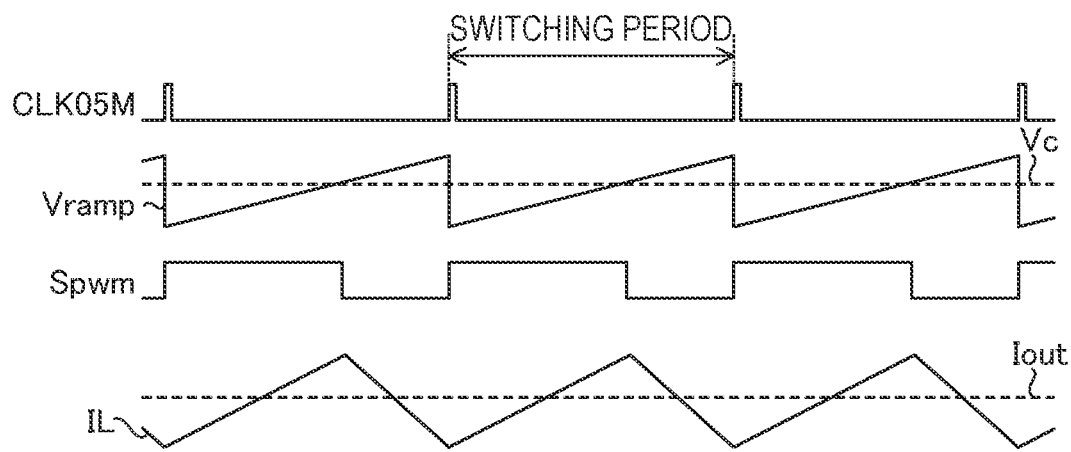

FIG. 7B shows the waveforms of the signal CLK05M, the voltages Vramp and Vc, the signal Spwm, the coil current IL, and the output current Iout as observed when the switching frequency is kept stably at the frequency $f_{O5M}$. When the switching frequency is the frequency $f_{O5M}$, the time interval between two consecutive up edges in the clock signal CLK05M is the switching period, and the main control circuit 3A makes the output stage circuit MM perform switching operation in synchronization with the clock signal CLK05M. Specifically, when the switching frequency is the frequency $f_{O5M}$, in synchronization with an up edge in the clock signal CLK05M, an up edge occurs in the signal Spwm, so that the output stage circuit MM is switched to the high-output state (i.e., the transistor M1 is turned on) and simultaneously, starting at the lower-limit voltage value Vramp_MIN (see FIG. 4), the ramp voltage Vramp starts to rise; thereafter, at the timing of a transition from Vramp<Vc to Vramp>Vc, a down edge occurs in the signal Spwm, so that the output stage circuit MM is switched to the low-output state (i.e., the transistor M1 is turned off).

Irrespective of whether the switching frequency is kept stably at the frequency $f_{2M}$ or at the frequency $f_{O5M}$, the average value of the coil current IL in each switching period is expected to be largely equal to the output current Iout, in which condition the output voltage Vout is stabilized at the target voltage Vtg.

In the switching power supply device 1A, as the voltage difference between the input voltage Vin and the output voltage Vout decreases, the duty of the output stage circuit MM (i.e., the on-duty of the transistor M1) increases (though the relationship may momentarily be Vin<Vout, it is here assumed that Vin>Vout). This means that the off-period of the transistor M1 in each switching period decreases. On the other hand, the off-period of the transistor M1 in each switching period is subject to a predetermined lower-limit time, and thus the off-period of the transistor M1 in each switching period is restricted to be equal to or more than the lower-limit time. In the switching power supply device 1A, the switching frequency is basically set to a comparatively high frequency $f_{2M}$ with a view to reducing ripples in the output voltage Vout and, when the voltage difference (Vin−Vout) is observed to decrease, is lowered from the frequency $f_{2M}$ to the frequency $f_{O5M}$. In this way, it is possible, while abiding by the restriction mentioned above, to keep the output voltage Vout at or as close as possible to the target voltage Vtg. In particular, in cases where the switching power supply device 1A is used in vehicle onboard applications, it is possible to avoid switching operation in the AM frequency band.

Caution, however, should be exercised when the switching frequency is switched between the frequencies $f_{2M}$ and $f_{O5M}$. The reason will now be described with reference to FIGS. 8 and 9. In the following description, for convenience' sake, the switching frequency is often by identified by the symbol "$f_{SW}$".

FIG. 8 shows, with solid lines, the waveform of the signal Spwm and the waveforms of the output voltage Vout and the coil current IL and, with a broken line, the waveform of the output current Iout, all as observed when first imaginary switching is performed. The first imaginary switching is imaginary operation, that is, operation which is not actually performed in the switching power supply IC 2A. In the first imaginary switching, when the switching frequency $f_{SW}$ is switched from the frequency $f_{2M}$ to the frequency $f_{O5M}$, when a 0.5-microsecond period at the frequency $f_{2M}$ ends, a 2-microsecond period at the frequency $f_{O5M}$ is simply started. Although the average value of the coil current IL during each switching period should be equal to the output current Iout, immediately after the switch to the frequency $f_{O5M}$ through first imaginary switching, the average value of the coil current IL during each switching period stays higher than the output current Iout for a while, causing an overshoot in the output voltage Vout.

Figure 9:
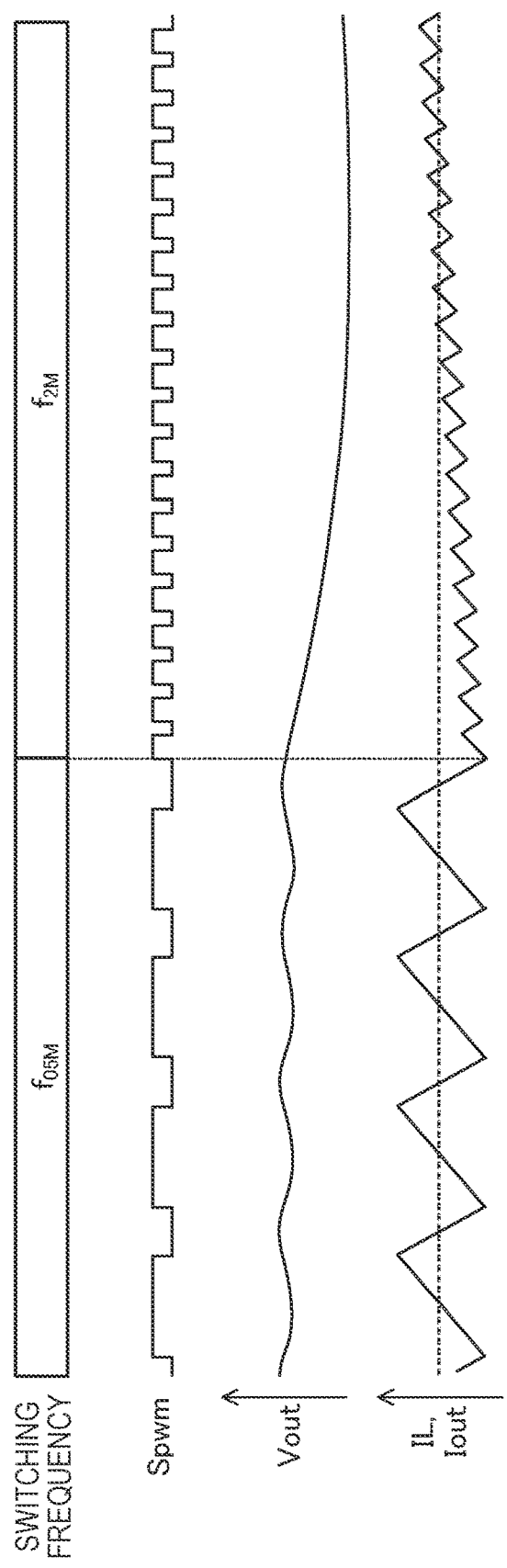
FIG. 9 is a diagram illustrating second imaginary switching operation.

FIG. 9 shows, with solid lines, the waveform of the signal Spwm and the waveforms of the output voltage Vout and the coil current IL and, with a broken line, the waveform of the output current Iout, all as observed when second imaginary switching is performed. The second imaginary switching is imaginary operation, that is, operation which is not actually performed in the switching power supply IC 2A. In the second imaginary switching, when the switching frequency $f_{SW}$ is switched from the frequency $f_{O5M}$ to the frequency $f_{2M}$, when a 2-microsecond period at the frequency $f_{O5M}$ ends, a 0.5-microsecond period at the frequency $f_{2M}$ is simply started. Although the average value of the coil current IL during each switching period should be equal to the output current Iout, immediately after the switch to the frequency $f_{2M}$ through second imaginary switching, the average value of the coil current IL during each switching period stays lower than the output current Iout for a while, causing an undershoot in the output voltage Vout.

Figure 10:
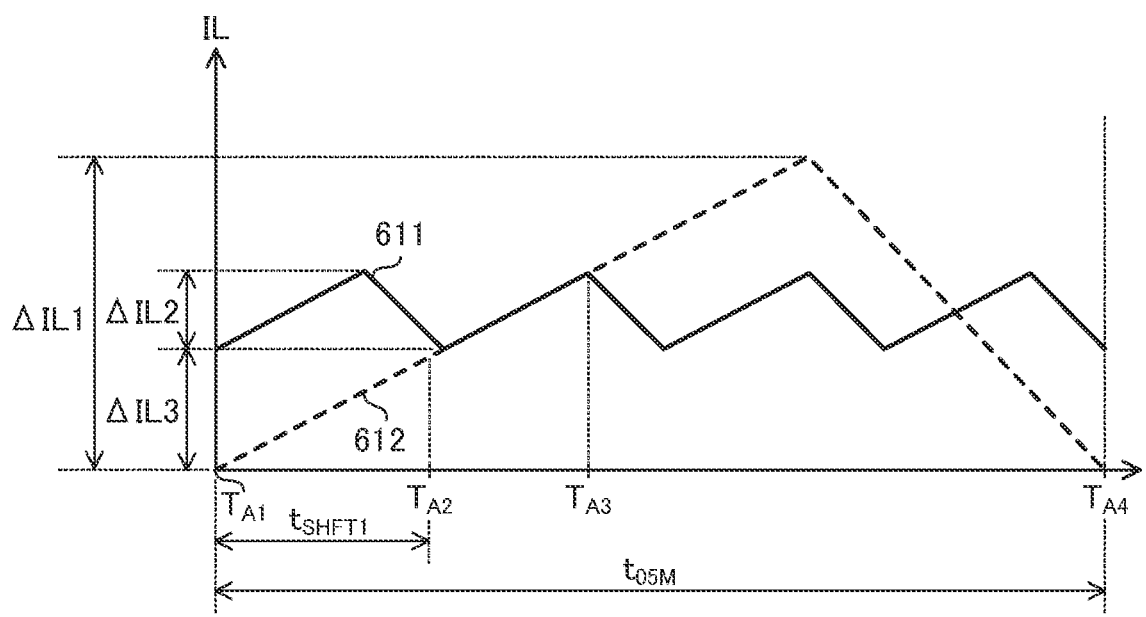
FIG. 10 is a diagram for a study of the waveform of a coil current related to the switching of a switching frequency according to the first embodiment of the present disclosure.

FIG. 10 shows the waveform 611 (solid line) of the coil current IL observed with $f_{SW}=f_{2M}$ and the waveform 612 (broken line) of the coil current IL observed with $f_{SW}=f_{O5M}$ in a form overlaid on each other. It should however be noted that FIG. 10 shows the waveform of the coil current IL under the condition where, while the coil current IL is in the process of increasing, the waveforms 611 and 612 overlap each other and in addition the time average of the coil current IL with the waveform 611 and the time average of the coil current IL with the waveform 612 are equal. Moreover, FIG. 10 assumed that the on-duty Don of the output stage circuit MM is ⅔. The on-duty Don of the output stage circuit MM denotes the proportion, in each switching period, of the on-period of the transistor M1 relative to the length of the switching period (in other words, the proportion of the on-period of the transistor M1 relative to the sum of the on-period and the off-period of the transistor M1 in each switching period).

Consider that, at timing $T_{A1}$, a switching period with $f_{SW}=f_{2M}$ starts and simultaneously a switching period with $f_{SW}=f_{O5M}$ starts. As time passes, timings $T_{A1}$, $T_{A2}$, $T_{A3}$, and $T_{A4}$ occur in this order. Timing $T_{A4}$ is a timing later than timing $T_{A1}$ by the reciprocal (here, 2 microseconds) of the frequency $f_{O5M}$. That is, the time $t_{O5M}$ between timings $T_{A1}$ and $T_{A4}$ has the length (here, 2 microseconds) corresponding to one switching period with $f_{SW}=f_{O5M}$. Assume that, between timings $T_{A1}$ and $T_{A4}$, the waveforms 611 and 612 overlap each other only between $T_{A2}$ and $T_{A3}$. Timing $T_{A2}$ is a timing later than timing $T_{A1}$ by a time $t_{SHFT1}$.

Figure 11:
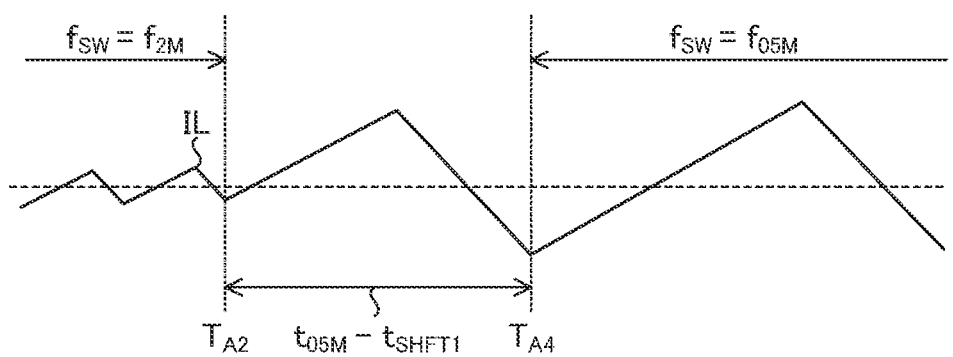
FIG. 11 is a diagram showing an ideal waveform of the coil current when the switching frequency is switched from 2 MHz to 500 kHz according to the first embodiment of the present disclosure.
Figure 12:
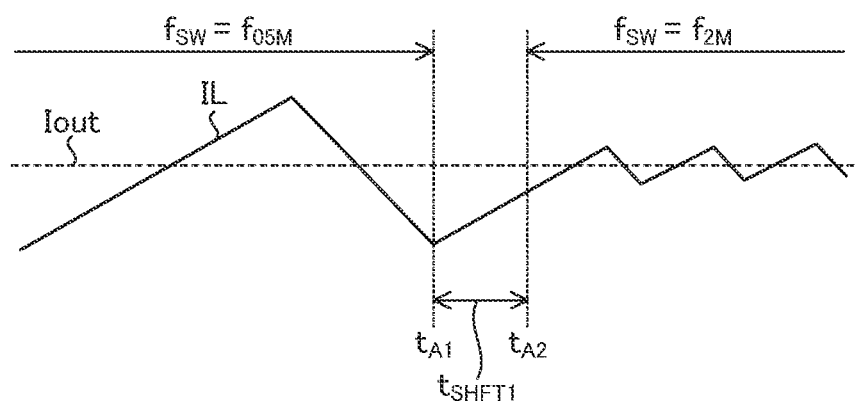
FIG. 12 is a diagram showing an ideal waveform of the coil current when the switching frequency is switched from 500 kHz 2 MHz according to the first embodiment of the present disclosure.

For the sake of discussion, suppose as follows: as shown in FIG. 11, on the occasion of a switch from $f_{SW}=f_{2M}$ to $f_{SW}=f_{O5M}$, a time period (corresponding to the transition period P1 described later) is secured that is equivalent to the interval between timings $T_{A2}$ and $T_{A4}$ so that, during that time period, the coil current IL with the waveform 612 between the timings $T_{A2}$ and $T_{A4}$ is passed through the coil L1 before a switch to $f_{SW}=f_{O5M}$ is actually effected. Then the switch proceeds without the average value of the coil current IL deviating from the output current Iout and no overshoot, like that shown in FIG. 8, should occur in the output voltage Vout. Likewise, for the sake of discussion, suppose as follows: as shown in FIG. 12, on the occasion of a switch from $f_{SW}=f_{O5M}$ to $f_{SW}=f_{2M}$, a time period (corresponding to the transition period P2 described later) is secured that is equivalent to the interval between timings $T_{A1}$ and $T_{A2}$ so that, during that time period, the coil current IL with the waveform 612 between the timings $T_{A1}$ and $T_{A2}$ is passed through the coil L1 before a switch to $f_{SW}=f_{2M}$ is actually effected. Then the switch proceeds without the average value of the coil current IL deviating from the output current Iout and no undershoot, like that shown in FIG. 9, should occur in the output voltage Vout.

Now, the time $t_{SHFT1}$ associated with the overlap between the waveforms 611 and 612 will be studied. In FIG. 10, ΔIL1 represents the amplitude of the coil current IL with the waveform 612, and ΔIL2 represents the amplitude of the coil current IL with the waveform 611 ΔIL3 represents the difference between the minimum value of the coil current IL with the waveform 611 and the minimum value of the coil current IL with the waveform 612. ΔIL3 as well represents the difference between the maximum value of the coil current IL with the waveform 611 and the maximum value of the coil current IL with the waveform 612. In the expressions used below, L represents the inductance of the coil L1.

First of all, with respect to the current amplitudes ΔIL1 and ΔIL2, Expressions (1) and (2) below hold, and according to these Expressions (1) and (2), Expression (3) below holds. On the other hand, in FIG. 10, ΔIL1=ΔIL2+2·ΔIL3, and thus, for the current amplitude ΔIL3, Expression (4) below holds.

[Expressions 1]

$$\Delta IL1 = \frac{(Vin - Vout)}{Vin} \cdot \frac{Vout}{L \cdot f_{O5M}} \quad (1)$$

$$\Delta IL2 = \frac{(Vin - Vout)}{Vin} \cdot \frac{Vout}{L \cdot f_{2M}} = \frac{(Vin - Vout)}{Vin} \cdot \frac{Vout}{L \cdot f_{O5M} \cdot 4} \quad (2)$$

$$\Delta IL2 = \frac{\Delta IL1}{4} \quad (3)$$

$$\Delta IL3 = \frac{\Delta IL1 - \Delta IL2}{2} = \frac{\Delta IL1 - \frac{\Delta IL1}{4}}{2} = \frac{3 \cdot \Delta IL1}{8} \quad (4)$$

Here, the terminal-to-terminal voltage E (=Vin−Vout) across the coil L1 corresponds to the product of the inductance L of the coil L1 and the time derivative of the coil current IL (E=L·dIL/dt). According to this relationship, suppose that, as the time $t_{SHFT1}$ passes, the coil current IL increases by ΔIL3. Then Expression (5) holds. Substituting Expressions (4) and (1) in Expression (5) gives Expression (6) below, and solving Expression (6) with respect to the time $t_{SHFT1}$ gives Expression (7) below. In deriving Expression (7), the following relationship is used: in ideal buck switching operation, Vout/Vin is equal to the on-duty Don of the output stage circuit MM.

[Expressions 2]

$$Vin - Vout = L \cdot \frac{\Delta IL3}{t_{SHFT1}} \quad (5)$$

$$Vin - Vout = \quad (6)$$
$$L \cdot \frac{1}{t_{SHFT1}} \cdot \frac{3 \cdot \Delta IL1}{8} = L \cdot \frac{1}{t_{SHFT1}} \cdot \frac{3}{8} \cdot \frac{(Vin - Vout)}{Vin} \cdot \frac{Vout}{L \cdot f_{O5M}}$$

$$t_{SHFT1} = L \cdot \frac{3}{8} \cdot \frac{1}{Vin} \cdot \frac{Vout}{L \cdot f_{O5M}} = \frac{3}{8} \cdot \frac{Vout}{Vin} \cdot \frac{1}{f_{O5M}} = \frac{3}{8} \cdot t_{O5M} \cdot Don \quad (7)$$

As will be understood from Expression (7), the time $t_{SHFT1}$ depends on the on-duty Don of the output stage circuit MM. For example, if Don=⅔, then $t_{SHFT1}$=(²⁄₈) $t_{O5M}$. In the numerical example assumed in this embodiment, since the time $t_{O5M}$ is 2 microseconds, if Don=⅔, then the time $t_{SHFT1}$ is 500 nanoseconds. For the sake of discussion, as the on-duty Don approaches one, the time $t_{SHFT1}$ approaches (⅜) $t_{O5M}$.

Figure 13:
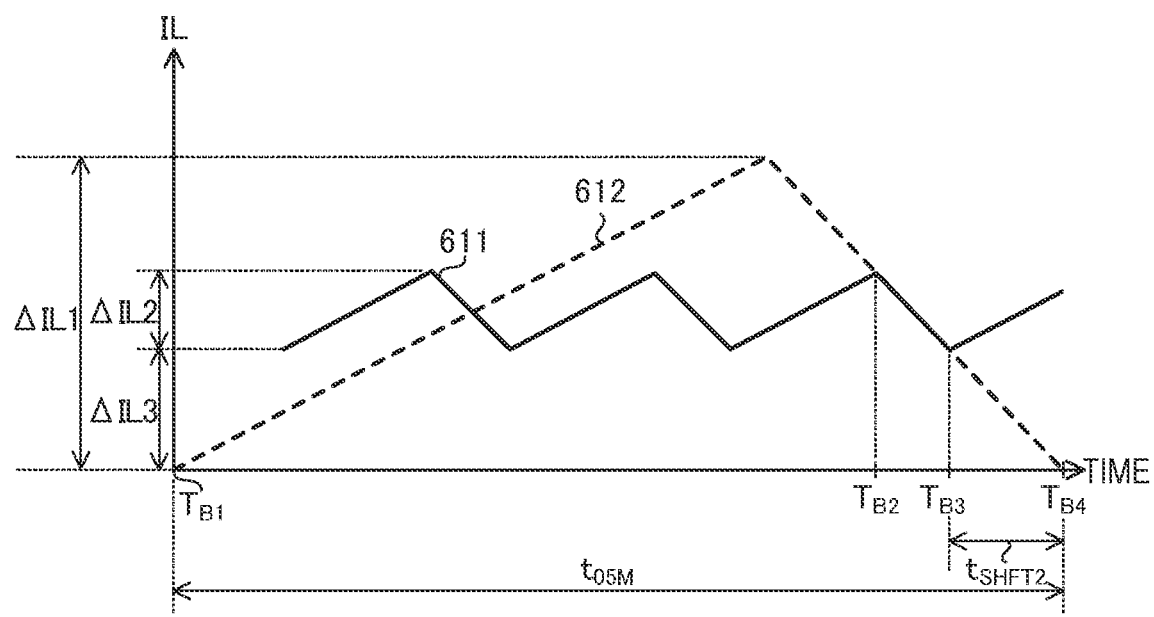
FIG. 13 is a diagram for a study of the waveform of a coil current related to the switching of a switching frequency according to the first embodiment of the present disclosure.

FIG. 13 shows the waveform 611 of the coil current IL with $f_{SW}=f_{2M}$ and the waveform 612 of the coil current IL with $f_{SW}=f_{O5M}$ in a form overlaid on each other. It should however be noted that FIG. 13 shows the waveform of the coil current IL under the condition where, while the coil current IL is in the process of decreasing, the waveforms 611 and 612 overlap each other and in addition the time average of the coil current IL with the waveform 611 and the time average of the coil current IL with the waveform 612 are equal.

Consider that, at timing $T_{B1}$, a switching period with $f_{SW}=f_{O5M}$ starts. As time passes, timings $T_{B1}$, $T_{B2}$, $T_{B3}$, and $T_{B4}$ occur in this order. Timing $T_{B4}$ is a timing later than timing $T_{B1}$ by the reciprocal (here, 2 microseconds) of the frequency $f_{O5M}$. That is, the time $t_{O5M}$ between timings $T_{B1}$ and $T_{B4}$ has the length corresponding to one switching period with $f_{SW}=f_{O5M}$. Assume that, between timings $T_{B1}$ and $T_{B4}$, the waveforms 611 and 612 overlap each other only between $T_{B2}$ and $T_{B3}$. The symbol $t_{SHFT2}$ represents the time between timing $T_{B3}$ and timing $T_{B4}$.

On a basis similar to that on which Expression (7) is derived above, the time $t_{SHFT2}$ is given by Expression (8) below. As will be understood from Expression (8), the time $t_{SHFT2}$ depends on the off-duty Doff of the output stage circuit MM. Doff=1−Don. For example, if Don=⅔, then $t_{SHFT2}=(⅛) t_{O5M}$. In the numerical example assumed in this embodiment, the time $t_{O5M}$ is 2 microseconds. Thus, if Don=⅔, then the time $t_{SHFT2}$ is 250 nanoseconds.

[Expressions 3]

$$t_{SHFT2}=⅜·t_{O5M}·\text{Doff} \quad (8)$$

When the switching frequency is switched between the frequencies $f_{2M}$ and $f_{O5M}$, either a first switching method or a second switching method can be employed. With the first switching method, as shown in FIG. 10, frequency switching takes place at a timing that, while the coil current IL is in the process of increasing, the waveforms 611 and 612 of the coil current IL overlap each other. With the second switching method, as shown in FIG. 13, frequency switching takes place at a timing that, while the coil current IL is in the process of decreasing, the waveforms 611 and 612 of the coil current IL overlap each other. By employing the first or second switching method, it is possible to avoid variation of the output voltage Vout during switching frequency switching.

With the first switching method, the switching of the switching frequency is controlled based on the time $t_{SHFT1}$, and with the second switching method, the switching of the switching frequency is controlled based on the time $t_{SHFT2}$. Neither method is however free from an error in the duty. Specifically, for example, even with a configuration designed to switch the switching frequency at Don=⅔, due to various error factors, the actual switching deviates from the design.

On the other hand, a switch of the switching frequency from the frequency $f_{2M}$ to the frequency $f_{O5M}$ is required when, as the input voltage Vin lowers, the voltage difference (Vin−Vout) decreases and the on-duty Don at least exceeds 50% and approaches 100%. In this situation, the gradient of the coil current IL is necessarily greater while the coil current IL is in the process of decreasing than while the coil current IL is in the process of increasing.

Then a comparison of the effect of an error in the control for switching the switching frequency based on the time $t_{SHFT1}$ by the first switching method with the effect of an error in the control for switching the switching frequency based on the time $t_{SHFT2}$ by the second switching method reveals that the latter is greater. Even with the same error, the second switching method causes a greater deviation from the ideal value of the coil current IL because of the steeper gradient of the coil current IL where waveforms overlap each other. A similar description applies to when the switching frequency is switched from the frequency $f_{O5M}$ to the frequency $f_{2M}$.

Considering the above, a description will now be given of the configuration and operation of the switching power supply device 1 that achieves the first switching method. The following description deals with as an example a configuration where the switching frequency is switched around the timing that the on-duty Don becomes equal to ⅔.

Figure 14:
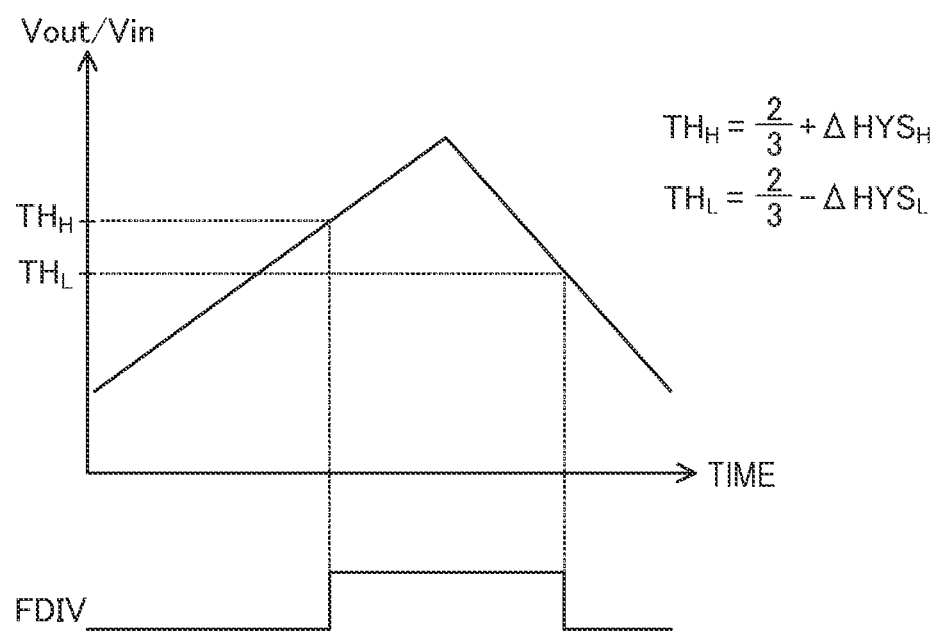
FIG. 14 is a diagram showing the relationship between an input-output voltage ratio and a frequency switch signal according to the first embodiment of the present disclosure.

Referring to FIG. 14, the frequency switch signal FDIV, which governs the switching of the switching frequency, will be described. The frequency switch signal generator 130 in FIG. 3 generates the frequency switch signal FDIV based on the ratio between the input voltage Vin and the output voltage Vout; specifically, it controls the level of the frequency switch signal FDIV based on the ratio (Vout/Vin) of the output voltage Vout to the input voltage Vin. The frequency switch signal generator 130 operates as follows. Starting in a state where the frequency switch signal FDIV is at low level and in addition the ratio (Vout/Vin) is lower than a predetermined threshold value $TH_H$, when the input voltage Vin lowers until a transition takes place from the state (Vout/Vin)<$TH_H$ to the state (Vout/Vin)>$TH_H$, the frequency switch signal generator 130 turns the frequency switch signal FDIV to high level. Thereafter, until the state (Vout/Vin)<$TH_L$ occurs, the frequency switch signal generator 130 keeps the frequency switch signal FDIV at high level and then, when the input voltage Vin rises until a transition occurs from the state (Vout/Vin)>$TH_L$ to the state (Vout/Vin) <$TH_L$, the frequency switch signal generator 130 turns the frequency switch signal FDIV to low level. Thereafter, until the state (Vout/Vin)>$TH_H$ occurs, the frequency switch signal generator 130 keeps the frequency switch signal FDIV at low level.

The threshold values $TH_H$ and $TH_L$ are set by leaving hysteresis widths about the reference threshold value of ⅔. Specifically, $TH_H$=⅔+$\Delta HYS_H$ and in addition $TH_L$=⅔−$\Delta HYS_L$. $\Delta HYS_H$ and $\Delta HYS_L$ are hysteresis widths each having a positive minute value. $\Delta HYS_H$ and $\Delta HYS_L$ may have equal values or different values. Either of $\Delta HYS_H$ and $\Delta HYS_L$ may be set to zero. In any case, $TH_H$>$TH_L$ holds. The frequency switch signal generator 130 can be built with (though none is illustrated) a first voltage division circuit that divides the input voltage Vin, a second voltage division circuit that divides the output voltage Vout, and a hysteresis comparator that compares the results of voltage division by the first and second voltage division circuits (the second voltage division circuit may be omitted).

As will be clarified through a later discussion, the controller 120 can control and set the switching frequency based on the frequency switch signal FDIV and switch the switching frequency between the frequencies $f_{2M}$ and $f_{O5M}$. Starting in a state where the frequency switch signal FDIV is at low level and switching operation is being performed with $f_{SW}=f_{2M}$, when (Vout/Vin)>$TH_H$ is fulfilled and the frequency switch signal FDIV turns to high level, a switch takes place from $f_{SW}=f_{2M}$ to $f_{SW}=f_{O5M}$. Thereafter, when (Vout/Vin)<$TH_L$ is fulfilled and the frequency switch signal FDIV turns to low level, a switch takes place from $f_{SW}=f_{O5M}$ to $f_{SW}=f_{2M}$.

Figure 15:
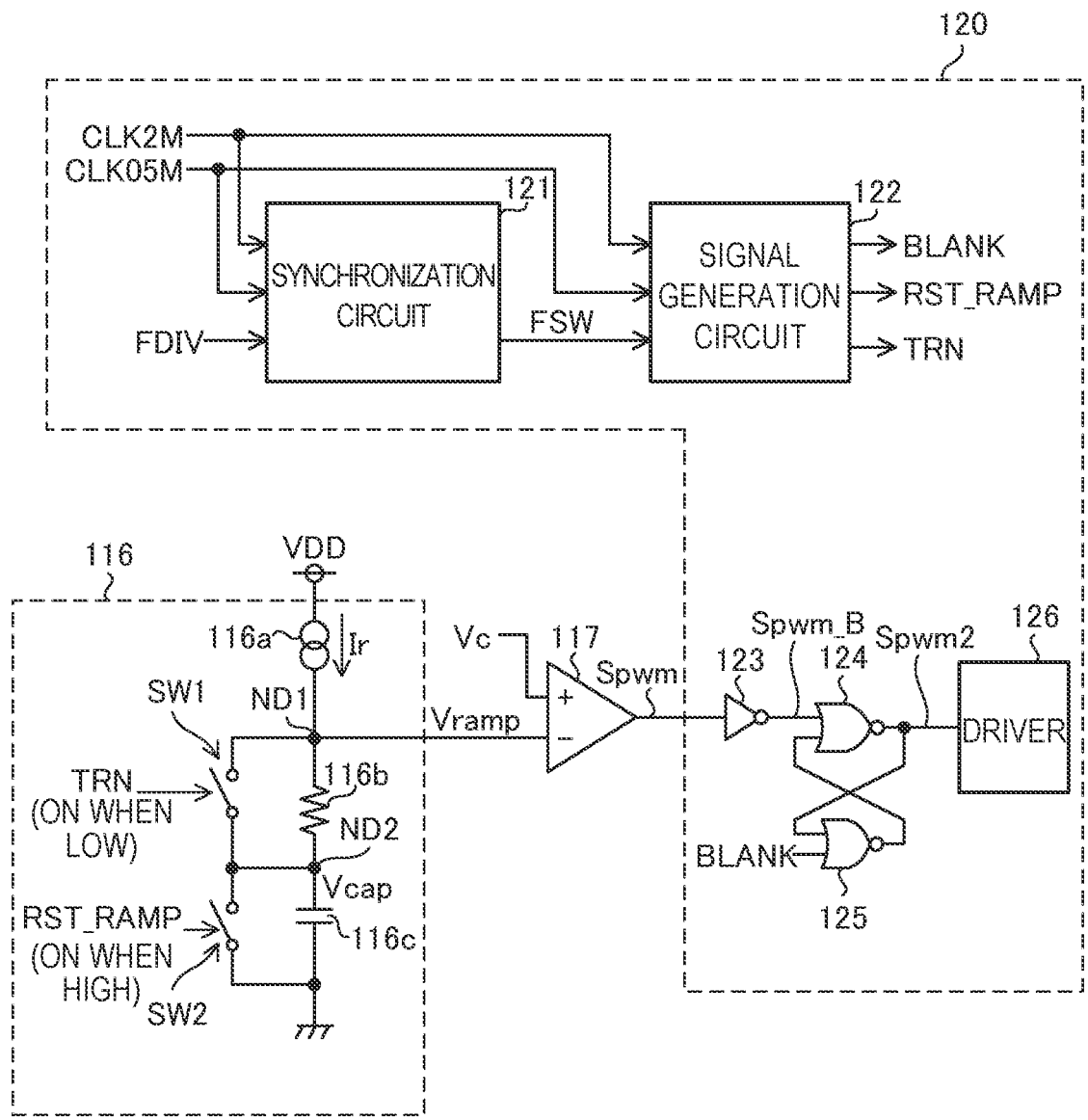
FIG. 15 is a diagram showing an example of the internal configuration of a ramp voltage generator and an example of the internal configuration of a controller according to the first embodiment of the present disclosure.

FIG. 15 shows the internal configuration of the controller 120 and the ramp voltage generator 116 along with their interconnection with the comparator 117 (PWM comparator).

The controller 120 includes a synchronization circuit 121. The frequency switch signal FDIV from the frequency switch signal generator 130 is an asynchronous signal that is not synchronous with a clock signal. The synchronization circuit 121 synchronizes the frequency switch signal FDIV with a clock signal to generate a frequency switch signal FSW synchronous with the clock signal.

Figure 16A:
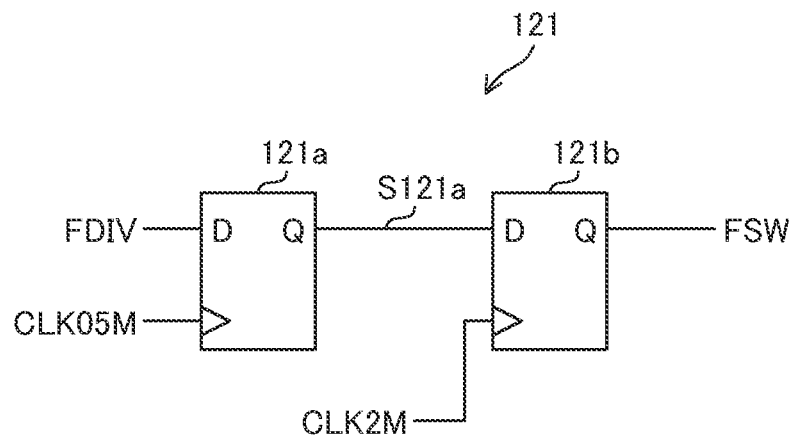
FIGS. 16A to 16C are diagrams illustrating the configuration and operation of a synchronization circuit shown in FIG. 15.

FIG. 16A shows a configuration example of the synchronization circuit 121. The synchronization circuit 121 in FIG. 16A includes FFs 121a and 121b. The FFs 121a and 121b are each a positive edge-triggered D flip-flop, and each have a D input terminal, a Q output terminal, and a clock terminal.

The D input terminal of the FF 121a is fed with the signal FDIV, and the clock terminal of the FF 121a is fed with the clock signal CLK05M. Thus, in synchronization with an up edge in the clock signal CLK05M, the level of the signal FDIV is acquired by and held in the FF 121a, so that from the Q output terminal of the FF 121a, a signal S121a with the level held in the FF 121a is output. The D input terminal of the FF 121b is fed with the output signal S121a from the Q output terminal of the FF 121a, and the clock terminal of the FF 121b is fed with the clock signal CLK2M. Thus, in synchronization with an up edge in the clock signal CLK2M, the level of the signal S121a is acquired by and held in the FF 121b, so that from the Q output terminal of the FF 121b, a signal with the level held in the FF 121b is output as the frequency switch signal FSW. The frequency switching signal FSW is a signal synchronous with the clock signal CLK2M.

Figure 16B:
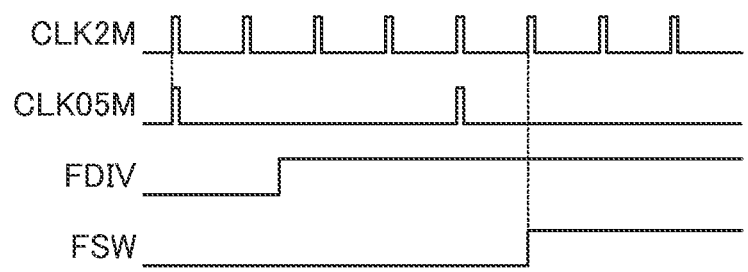

As shown in FIG. 16B, when at a given timing an up edge occurs in the signal FDIV, at the next up-edge timing of the clock signal CLK05M, a high-level signal FDIV is acquired by the FF 121a, and at the next up-edge timing of the clock signal CLK2M (i.e., at the up-edge timing of the clock signal CLK2M after the lapse of a time corresponding to one period of the clock signal CLK2M from the acquisition of the signal by the FF 121a), an up edge based on the high-level signal S121a occurs in the frequency switch signal FSW.

Figure 16C:
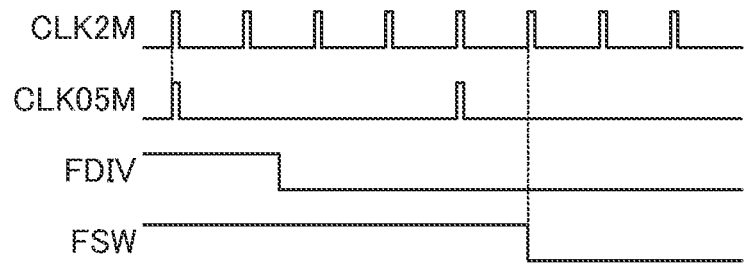

As shown in FIG. 16C, when at a given timing a down edge occurs in the signal FDIV, at the next up-edge timing of the clock signal CLK05M, a low-level signal FDIV is acquired by the FF 121a, and at the next up-edge timing of the clock signal CLK2M (i.e., at the up-edge timing of the clock signal CLK2M after the lapse of the time corresponding to one period of the clock signal CLK2M from the acquisition of the signal by the FF 121a), a down edge based on the low-level signal S121a occurs in the frequency switch signal FSW.

The controller 120 in FIG. 15 also includes a signal generation circuit 122. The signal generation circuit 122 is a logic circuit that generates signals BLANK, RST_RAMP, and TRN based on the clock signals CLK2M and CLK05M and the frequency switch signal FSW. The relationship between the input and output signals to and from the signal generation circuit 122 will be described later.

The controller 120 in FIG. 15 includes an inverter circuit 123, NOR circuits 124 and 125, which are negative OR circuits, and a driver 126. The negative OR circuit has a first and a second input terminal and an output terminal. Only if the signals fed to its first and second input terminals are both at low level does the negative OR circuit output from its output terminal a high-level signal; if at least one of the signals fed to its first and second input terminals is at high level, the negative OR circuit outputs from its output terminal a low-level signal.

The inverter circuit 123 receives the signal Spwm output from the comparator 117 to output the inversion signal Spwm_B of the signal Spwm. The first input terminal of the NOR circuit 124 is fed with the signal Spwm_B, and the second input terminal of the NOR circuit 124 is fed with the output signal of the NOR circuit 125. The first input terminal of the NOR circuit 125 is fed with the output signal of the NOR circuit 124 and the second input terminal of the NOR circuit 125 is fed with the signal BLANK. The output signal of the NOR circuit 124 will be referred to as the signal Spwm2.

The NOR circuits 124 and 125 constitute an asynchronous RS flip-flop circuit.

Specifically, under the condition that the signal Spwm_B is at low level, when the signal BLANK is at high level, the signal Spwm2 is at high level, and thereafter until the signal Spwm_B turns to high level, the signal Spwm 2 is kept at high level. Likewise, under the condition that the signal BLANK is at low level, when the signal Spwm_B turns to high level, the signal Spwm2 turns to low level, and thereafter until the signal BLANK turns to high level, the signal Spwm2 is kept at low level.

During the high-level period of the signal Spwm2, the driver 126 feeds a high-level gate signal G1 and a low-level gate signal G2 to the gates of the transistors M1 and M2 to set the output stage circuit MM to the high-output state (i.e., sets the transistor M1 on and the transistor M2 off); during the low-level period of the signal Spwm2, the driver 126 feeds a low-level gate signal G1 and a high-level gate signal G2 to the gates of the transistors M1 and M2 to set the output stage circuit MM to the low-output state (i.e., sets the transistor M1 off and the transistor M2 on).

As will be shown in timing charts and the like referred to later, the high-level period of the signal Spwm2 is substantially the same as the high-level period of the signal Spwm, and the low-level period of the signal Spwm2 is substantially the same as the low-level period of the signal Spwm. Accordingly, a modification is possible where the inverter circuit 123 and the NOR circuits 124 and 125 are omitted from the controller 120, and the pulse width modulation signal Spwm itself is fed as the signal Spwm2 to the driver 126. Adopting this modification eliminates the need for the signal BLANK.

The ramp voltage generator 116 includes a current source 116a that generates and outputs a ramp current Ir, a resistor 116b as an offset resistor, a capacitor 116c as a ramp capacitor, and switches SW1 and SW2 as short-circuiting switches. The ramp voltage generator 116 has a node ND1 (ramp node) and a node ND2, and the ramp voltage Vramp appears at the node ND1. The voltage that appears at the node ND2 will be identified by the symbol "Vcap".

The current source 116a is inserted between an application terminal for a predetermined positive supply voltage VDD and the node ND1. The current source 116a generates the ramp current Ir based on the supply voltage VDD, and feeds the ramp current Ir from the application terminal for the supply voltage VDD toward the node ND1. The supply voltage VDD may be the input voltage Vin itself, or any other direct-current voltage generated based on the input voltage Vin within the switching power supply IC 2A.

The resistor 116b is inserted between the nodes ND1 and ND2. That is, one terminal of the resistor 116b is connected to the node ND1, and the other terminal of the resistor 116b is connected to the node ND2. The capacitor 116c is connected between the node ND2 and the ground. That is, one terminal of the capacitor 116c is connected to the node ND2, and the other terminal of the capacitor 116c is connected to the ground. The voltage Vcap at the node ND2 is the terminal-to-terminal voltage across the capacitor 116c. During each period at the switching frequency (i.e., during each of a plurality of switching periods occurring at time intervals equal to the reciprocal of the switching frequency), the capacitor 116c accumulates electric charge attributable to the ramp current Ir to produce the voltage Vcap attributable to the accumulated electric charge.

The switch SW1 is connected in parallel with the resistor 116b, and the switch SW2 is connected to in parallel with the capacitor 116c. The state of the switch SW1 is controlled based on the signal TRN. Here, it is assumed that, when the signal TRN is at low level, the switching terminal SW is in the on state and that, when the signal TRN is at high level, the switch SW1 is in the off state. With the switch SW1 in the on state, the resistor 116b is short-circuited across its terminals via the switch SW1. Here, it is also assumed that, when the signal RST_RAMP is at high level, the switch SW2 is in the on state and that, when the signal RST_RAMP is at low level, the switch SW2 is in the off state. With the switch SW2 in the on state, the capacitor 116c is short-circuited across its terminals via the switch SW2.

FIG. 17 is a timing chart obtained in Case CS1 where the relationship $f_{SW}=f_{2M}$ is maintained throughout. Referring to FIG. 17, a description will be given of the operation of the switching power supply device 1A in Case CS1. FIG. 17 shows, from top to bottom, with solid lines, the waveforms of the signal CLK2M, the signal CLK05M, the signal FDIV, the signal FSW, the signal BLANK, the signal RST_RAMP, the signal TRN, the voltage Vcap, the voltage Vramp, the signal Spwm, the signal Spwm2, and the current IL. FIG. 17 also shows, along with the waveform (solid line) of the ramp voltage Vramp, the waveform of the comparison voltage Vc with a broken line and, along with the waveform (solid line) of the coil current IL, the waveform of the output current Iout with a broken line. In FIG. 17, it is assumed that the comparison voltage Vc and the output current Iout are constant.

In Case CS1, where the relationship $f_{SW}=f_{2M}$ is maintained throughout, the ratio (Vout/Vin) is kept at a comparatively low value, with the result that the frequency switch signal FDIV is kept at low level. Accordingly, in Case CS1, also the frequency switch signal FSW is kept at low level. The signal generation circuit 122 in FIG. 15, in the low-level period of the signal FSW, outputs as the signals BLANK and RST_RAMP rectangular-wave signals at the frequency $f_{2M}$ synchronous with the clock signal CLK2M. The signals BLANK and RST_RAMP are basically at low level, and during the low-level period of the signal FSW, in synchronization with up edges in the clock signal CLK2M, up edges occur also in the signals BLANK and RST_RAMP. It is here assumed that, during the low-level period of the signal FSW, in synchronization with down edges in the clock signal CLK2M, down edges occur also in the signals BLANK and RST_RAMP. In this case, during the low-level period of the signal FSW, the signals BLANK and RST_RAMP each have the same waveform as the clock signal CLK2M.

At least in the signal RST_RAMP, the length of one high-level period is sufficiently shorter than the reciprocal of the frequency $f_{2M}$ (this applies in case, including CS2 to CS4 described below).

The signal TRN is basically at low level, and stays at high level momentarily when an up edge occurs in the signal FSW (details will be given later). Thus in Case CS1, the signal TRN is kept at low level. The level of the signal Spwm depends on the magnitude relationship between the ramp voltage Vramp and the comparison voltage Vc, and the signal Spwm2 has substantially the same waveform as the signal Spwm. The average value of the coil current IL in each switching period is largely equal to the output current Iout.

In Case CS1, since the signal TRN is kept at low level, the resistor 116b remains short-circuited via the switch SW1 in the on state, and the ramp voltage Vramp is always equal to the voltage Vcap (for simplicity's sake, the on-state resistance of the switch SW1 is ignored here).

In Case CS1, in each of the switching periods occurring at intervals equal to the reciprocal of the frequency $f_{2M}$, first, the signal RST_RAMP, now at high level in synchronization with an up edge in the clock signal CLK2M, discharges the electric charge accumulated in the capacitor 116c, so that the voltages Vcap and Vramp turn to a predetermined first initial voltage (here, 0 V). Then, owing to the signal BLANK, now at high level, and the operation of the circuits identified by the reference signs 117 and 123 to 126, the signal Spwm2 turns to high level, so that the output stage circuit MM switches from the low-output state to the high-output state. In synchronization with the switch of the output stage circuit MM to the high-output state (more precisely, after the occurrence of a down edge in the signal RST_RAMP), owing to the ramp current Ir, the voltages Vcap and Vramp starts to increase linearly starting at the predetermined first initial voltage. Thereafter, when the transition from Vramp<Vc to Vramp>Vc takes place, owing to the operation of the circuits identified by the reference signs 117 and 123 to 126, the signal Spwm2 turns to low level, and the output stage circuit MM switches from the high-output state to the low-output state. Then, at the next up-edge timing of the clock signal CLK2M corresponding to the timing of the start of the next switching period, the signal RST_RAMP is turned back to high level, and the voltages Vcap and Vramp turn back to the first initial voltage.

The first initial voltage mentioned above is the minimum value that the ramp voltage Vramp can take as it varies, and corresponds to the lower-limit voltage value Vramp_MIN (FIG. 4) mentioned earlier. While the first initial voltage is 0 V in the circuit configuration in FIG. 15, it may be any voltage other than 0 V.

Figure 18:
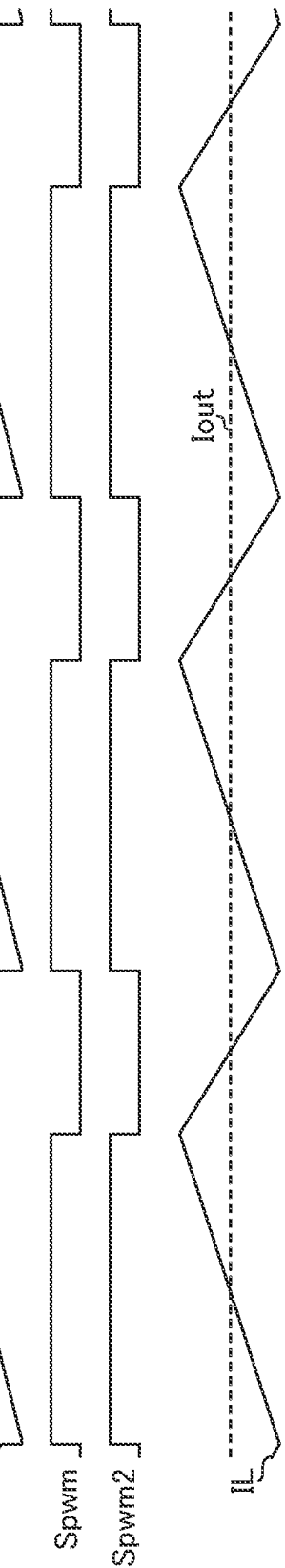
FIG. 18 is a timing chart of the switching power supply device according to the first embodiment of the present disclosure (Case CS2)

FIG. 18 is a timing chart obtained in Case CS2 where the relationship $f_{SW}=f_{05M}$ is maintained throughout. Referring to FIG. 18, a description will be given of the operation of the switching power supply device 1A in Case CS2. FIG. 18 shows, from top to bottom, with solid lines, the waveforms of the signal CLK2M, the signal CLK05M, the signal FDIV, the signal FSW, the signal BLANK, the signal RST_RAMP, the signal TRN, the voltage Vcap, the voltage Vramp, the signal Spwm, the signal Spwm2, and coil current IL. FIG. 18 also shows, along with the waveform (solid line) of the ramp voltage Vramp, the waveform of the comparison voltage Vc with a broken line and, along with the waveform (solid line) of the coil current IL, the waveform of the output current Iout with a broken line. In FIG. 18, it is assumed that the comparison voltage Vc and the output current Iout are constant.

In Case CS2, where the relationship $f_{SW}=f_{05M}$ is maintained throughout, the ratio (Vout/Vin) is kept at a comparatively high value, with the result that the frequency switch signal FDIV is kept at high level. Accordingly, in Case CS2, also the frequency switch signal FSW is kept at high level. The signal generation circuit 122 in FIG. 15, in the high-level period of the signal FSW, outputs as the signals BLANK and RST_RAMP rectangular-wave signals at the frequency $f_{05M}$ synchronous with the clock signal CLK05M. The signals BLANK and RST_RAMP are basically at low level, and during the high-level period of the signal FSW, in synchronization with up edges in the clock signal CLK05M, up edges occur also in the signals BLANK and RST_RAMP. It is here assumed that, during the high-level period of the signal FSW, in synchronization with down edges of the clock signal CLK05M, down edges occur also in the signals BLANK and RST_RAMP. In this case, during the high-level period of the signal FSW, the signals BLANK and RST_RAMP each have the same waveform as the clock signal CLK05M.

The signal TRN is basically at low level, and stays at high level momentarily when an up edge occurs in the signal FSW (details will be given later). Thus in Case CS2, the signal TRN is kept at low level. The level of the signal Spwm depends on the magnitude relationship between the ramp voltage Vramp and the comparison voltage Vc, and the signal Spwm2 has substantially the same waveform as the signal Spwm. The average value of the coil current IL in each switching period is largely equal to the output current Iout.

In Case CS2, as in Case CS1, since the signal TRN is kept at low level, the resistor 116b remains short-circuited via the switch SW1 in the on state, and the ramp voltage Vramp is always equal to the voltage Vcap (for simplicity's sake, the on-state resistance of the switch SW1 is ignored here).

In Case CS2, in each of the switching periods occurring at intervals equal to the reciprocal of the frequency $f_{O5M}$, first, the signal RST_RAMP, now at high level in synchronization with an up edge in the clock signal CLK05M, discharges the electric charge accumulated in the capacitor 116c, so that the voltages Vcap and Vramp turn to a predetermined first initial voltage (here, 0 V). Then, owing to the signal BLANK, now at high level, and the operation of the circuits identified by the reference signs 117 and 123 to 126, the signal Spwm2 turns to high level, so that the output stage circuit MM switches from the low-output state to the high-output state. In synchronization with the switch of the output stage circuit MM to the high-output state (more precisely, after the occurrence of a down edge in the signal RST_RAMP), owing to the ramp current Ir, the voltages Vcap and Vramp start to increase linearly starting at the predetermined first initial voltage. Thereafter, when the transition from Vramp<Vc to Vramp>Vc takes place, owing to the operation of the circuits identified by the reference signs 117 and 123 to 126, the signal Spwm2 turns to low level, and the output stage circuit MM switches from the high-output state to the low-output state. Then, at the next up-edge timing of the clock signal CLK05M corresponding to the timing of the start of the next switching period, the signal RST_RAMP is turned back to high level, and the voltages Vcap and Vramp turn back to the first initial voltage.

The current source 116a sets the value of the ramp current Ir based on the signal FSW. The value of the ramp current Ir during the low-level period of the signal FSW will be represented by $Ir_{2M}$, and the value of the ramp current Ir during the high-level period of the signal FSW will be represented by $Ir_{O5M}$. Then the current source 116a adjusts and sets the value of the ramp current Ir based on the signal FSW such that $Ir_{2M}:Ir_{O5M}=f_{2M}:f_{O5M}$. Here, $f_{2M}:f_{O5M}=4:1$, and thus the current value $Ir_{2M}$ is equal to four times the current value $Ir_{O5M}$. Making the ramp current Ir proportional to the switching frequency in this way results in making the gradient of variation of the ramp voltage Vramp proportional to the switching frequency. That is, the ratio between the gradient of variation of the ramp voltage Vramp with the switching frequency set to frequency $f_{2M}$ and the gradient of variation of the ramp voltage Vramp with the switching frequency set to frequency $f_{O5M}$ is $f_{2M}:f_{O5M}$. Then the amplitude of the ramp voltage Vramp does not depend on the switching frequency. Thus, an adequate on-duty Don is obtained according to the comparison voltage Vc despite the switching of the switching frequency.

The ramp current Ir may be made proportional to the input voltage Vin. For example, in a case where the output voltage Vout and the target voltage Vtg are 5 V, if the input voltage Vin is 10 V, the adequate on-duty Don is 50%, and if the input voltage Vin is 20 V, the adequate on-duty Don is 25%. In this case, if the ramp current Ir is made proportional to the input voltage Vin, when, for example, the input voltage Vin changes abruptly from 10 V to 20 V, even with no variation in the comparison voltage Vc, the on-duty Don instantaneously changes from 50% adequate for Vin=10 V to 25% adequate for Vin=20 V. The current source 116a can, by subjecting the input voltage Vin to voltage-current conversion, make the ramp current Ir proportional to the input voltage Vin.

Figure 19:
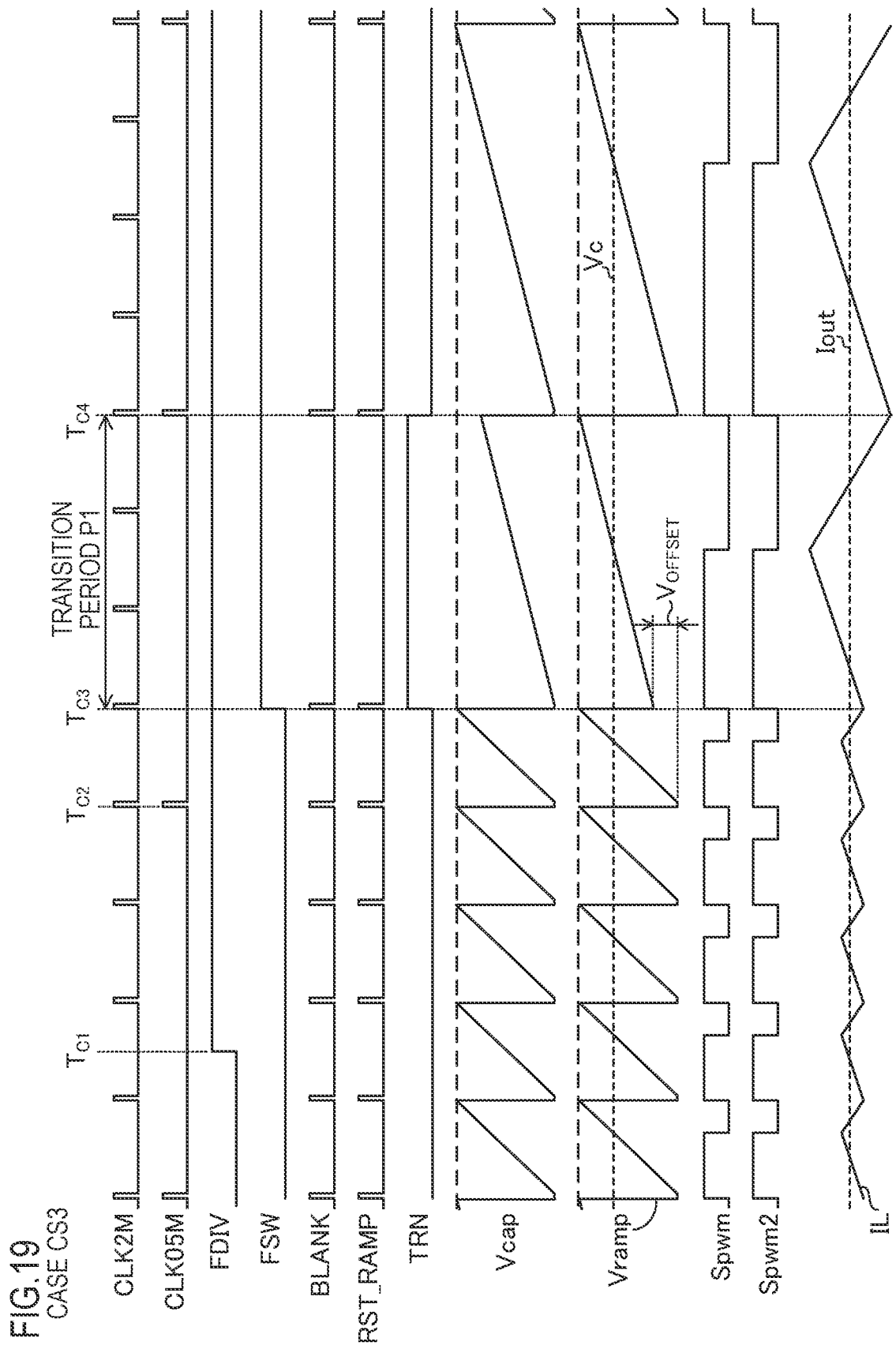
FIG. 19 is a timing chart of the switching power supply device according to the first embodiment of the present disclosure (Case CS3)

FIG. 19 is a timing chart obtained in Case CS3 where the switching frequency undergoes a switch from the frequency $f_{2M}$ to the frequency $f_{O5M}$. Referring to FIG. 19, a description will be given of the operation of the switching power supply device 1A in Case CS3. FIG. 19 shows, from top to bottom, with solid lines, the waveforms of the signal CLK2M, the signal CLK05M, the signal FDIV, the signal FSW, the signal BLANK, the signal RST_RAMP, the signal TRN, the voltage Vcap, the voltage Vramp, the signal Spwm, the signal Spwm2, and the current IL. FIG. 19 also shows, along with the waveform (solid line) of the ramp voltage Vramp, the waveform of the comparison voltage Vc with a broken line and, along with the waveform (solid line) of the coil current IL, the waveform of the output current Iout with a broken line. In FIG. 19, it is assumed that the comparison voltage Vc and the output current Iout are constant. Suppose that, as time passes, timings $T_{C1}$, $T_{C2}$, $T_{C3}$, and $T_{C4}$ occur in this order.

In Case CS3, before timing $T_{C1}$, the frequency switch signal FDIV is kept at low level, and thus, before timing $T_{C1}$, operation proceeds in a similar manner as in Case CS1 in FIG. 17. In Case CS3, suppose that, at timing $T_{C1}$, the signal FDIV turns from low level to high level and that, after timing $T_{C1}$, the signal FDIV is kept at high level.

When at timing $T_{C1}$ an up edge occurs in the signal FDIV, then at timing $T_{C2}$, a high-level signal FDIV is acquired by the FF 121a (see FIG. 16A), and then at timing $T_{C3}$ an up edge occurs in the signal FSW. Timing $T_{C2}$ is the up-edge timing of the clock signal CLK05M that occurs after and is closest to timing $T_{C1}$. Timing $T_{C3}$ is the next up-edge timing of the clock signal CLK2M after timing $T_{C2}$. Thus, the time difference between timings $T_{C2}$ and $T_{C3}$ is equal to the reciprocal of the frequency $f_{2M}$.

The signal generation circuit 122 in FIG. 15, when producing an up edge in the signal FSW, produces in synchronization with the up edge in the signal FSW an up edge also in the signal TRN; then after the lapse of a predetermined time from the up-edge timing of the signal TRN, namely at timing $T_{C4}$, the signal generation circuit 122 produces a down edge in the signal TRN. The time period that has the length of the just mentioned predetermined time will be referred to as the transition period P1. The transition period P1 is the time period between timings $T_{C3}$ and $T_{C4}$. Timing $T_{C3}$ corresponds to timing $T_{A2}$ in FIGS. 10 and 11, and $T_{C4}$ corresponds to timing $T_{A4}$ in FIGS. 10 and 11. The signal TRN is at high level only during the transition period P1, and is always at low level outside the transition period P1.

The length of the transition period P1 is set to a length shorter than the time $t_{O5M}$ in FIG. 10 by the time $t_{SHFT1}$, and is thus shorter than the reciprocal of the frequency $f_{O5M}$. This embodiment assumes a configuration where the switching frequency is switched around a timing that the on-duty Don becomes equal to ⅔; since as mentioned above if Don=⅔ then $t_{SHFT1}$=(⅝)·$t_{05M}$, the length of the transition period P1 is equal to (⅝)·$t_{05M}$. In this embodiment, it is assumed that the frequency $f_{2M}$ is 2 MHz and in addition that the frequency $f_{05M}$ is 500 kHz, and thus the length of the transition period P1 is three times the reciprocal of the frequency $f_{2M}$, that is, 1.5 microseconds.

At the up-edge timing $T_{C3}$ of the signal FSW, the signal generation circuit 122 produces an up edge not only in the signal TRN but also in the signals BLANK and RST_RAMP. The signal RST_RAMP, turned to high level at timing $T_{C3}$, discharges the electric charge accumulated in the capacitor 116c, so that the voltage Vcap turns to a predetermined first initial voltage (here, 0 V). Immediately after timing $T_{C3}$, when a down edge occurs in the signal RST_RAMP, owing to the ramp current Ir, the voltage Vcap starts to increase linearly starting at the predetermined first initial voltage.

During the transition period P1, since the signal TRN is at high level, the switch SW is off, and accordingly the ramp voltage Vramp is equal to the voltage Vcap plus the voltage drop across the resistor 116b. The voltage drop across the resistor 116b (i.e., the terminal-to-terminal voltage across the resistor 116b) during the transition period P1 will be referred to as the offset voltage $V_{OFFSET}$. Moreover, during the transition period P1, since the signal FSW is at high level, the value of the ramp current Ir during the transition period P1 is equal to the current value $Ir_{05M}$ (i.e., the value of the ramp current Ir with the switching frequency set to the frequency $f_{05M}$). Thus, the gradients of variation of the voltages Vcap and Vramp during the transition period P1 are equal to the gradients of variation of the voltages Vcap and Vramp with the switching frequency set to the frequency $f_{05M}$.

The offset voltage $V_{OFFSET}$ corresponds to the voltage resulting from multiplying by a predetermined coefficient $k_{OFFSET}$ less than one the amount of change of the ramp voltage Vramp (i.e., the amplitude of the ramp voltage Vramp) during one period with the switching frequency set to the frequency $f_{05M}$. It should however be noted that the offset voltage $V_{OFFSET}$ is lower than the comparison voltage Vc (largely ⅔ of the amplitude of the ramp voltage Vramp) at the timing that the switching frequency is switched from the frequency $f_{2M}$ to the frequency $f_{05M}$. The predetermined coefficient $k_{OFFSET}$ is determined according to the ratio between the frequencies $f_{2M}$ and $f_{05M}$, and in the numerical example assumed in this embodiment, $k_{OFFSET}$=¼. The resistance value of the resistor 116b can be determined such that $k_{OFFSET}$=¼.

When the current value of the ramp current Ir is represented by Ir and the capacitance value of the capacitor 116c is represented by Cslp, the maximum value of the ramp voltage Vramp (i.e., the amount of change of the ramp voltage Vramp during one period) Vramp_peak with the switching frequency set to the frequency $f_{05M}$ is given by Vramp_peak=Ir×$t_{05M}$/Cslp (the time $t_{05M}$ is equal to the reciprocal of the frequency $f_{05M}$; see FIG. 10). Then, considering that the offset voltage $V_{OFFSET}$ should fulfill $V_{OFFSET}$=(¼)×Vramp_peak, $V_{OFFSET}$=(¼)×Ir×$t_{05M}$ Cslp" has to be fulfilled, and thus the resistance value of the resistor 116b can be set to (¼)×$t_{05M}$/Cslp.

This embodiment assumes a configuration where the switching frequency is switched around a timing that the on-duty Don becomes equal to ⅔; thus, during the transition period P1, the comparison voltage Vc is expected to have a voltage value resulting from multiplying by approximately ⅔ the amount of change of the ramp voltage Vramp (i.e., the amplitude of the ramp voltage Vramp) during one period with the switching frequency set to the frequency $f_{05M}$. Accordingly, at timing $T_{C3}$, owing to the signal BLANK, now at high level, and the operation of the circuits identified by the reference signs 117 and 123 to 126, the signal Spwm2 turns to high level, so that the output stage circuit MM switches from the low-output state to the high-output state.

In synchronization with the switch of the output stage circuit MM to the high-output state at timing $T_{C3}$ (more precisely, after the occurrence of a down edge in the signal RST_RAMP), owing to the ramp current Ir, the voltages Vcap and Vramp start to increase linearly, and here the ramp voltage Vramp starts to increase linearly starting at a second initial voltage, as opposed to the transition period P1, in which the voltage Vcap starts to increase linearly starting at the first initial voltage (here, 0 V). Here, the second initial voltage results from adding the offset voltage $V_{OFFSET}$ to the first initial voltage.

Thereafter, during the transition period P1, when a transition from Vramp<Vc to Vramp>Vc takes place, owing to the operation of the circuits identified by the reference signs 117 and 123 to 126, the signal Spwm2 turns to low level, so that the output stage circuit MM switches from the high-output state to the low-output state.

In Case CS3, at and after timing $T_{C4}$, the signal FSW is at high level, and thus operation proceeds as in Case CS2 in FIG. 18. Accordingly, at timing $T_{C4}$, in synchronization with an up edge in the clock signal CLK05M, an up edge occurs in the signals BLANK and RST_RAMP, and as a result the voltages Vcap and Vramp turn to the predetermined first initial voltage (here, 0 V); owing to the signal BLANK, now at high level, and the operation of the circuits identified by the reference signs 117 and 123 to 126, the signal Spwm2 turns to high level, so that the output stage circuit MM switches from the low-output state to the high-output state. In synchronization with the switch of the output stage circuit MM to the high-output state at timing $T_{C4}$ (more precisely, after the occurrence of a down edge in the signal RST_RAMP), owing to the ramp current Ir, the voltages Vcap and Vramp start to increase linearly starting at the predetermined first initial voltage. Thereafter, when a transition from Vramp<Vc to Vramp>Vc takes place, owing to the operation of the circuits identified by the reference signs 117 and 123 to 126, the signal Spwm2 turns to low level, so that the output stage circuit MM switches from the high-output state to the low-output state.

Figure 20:
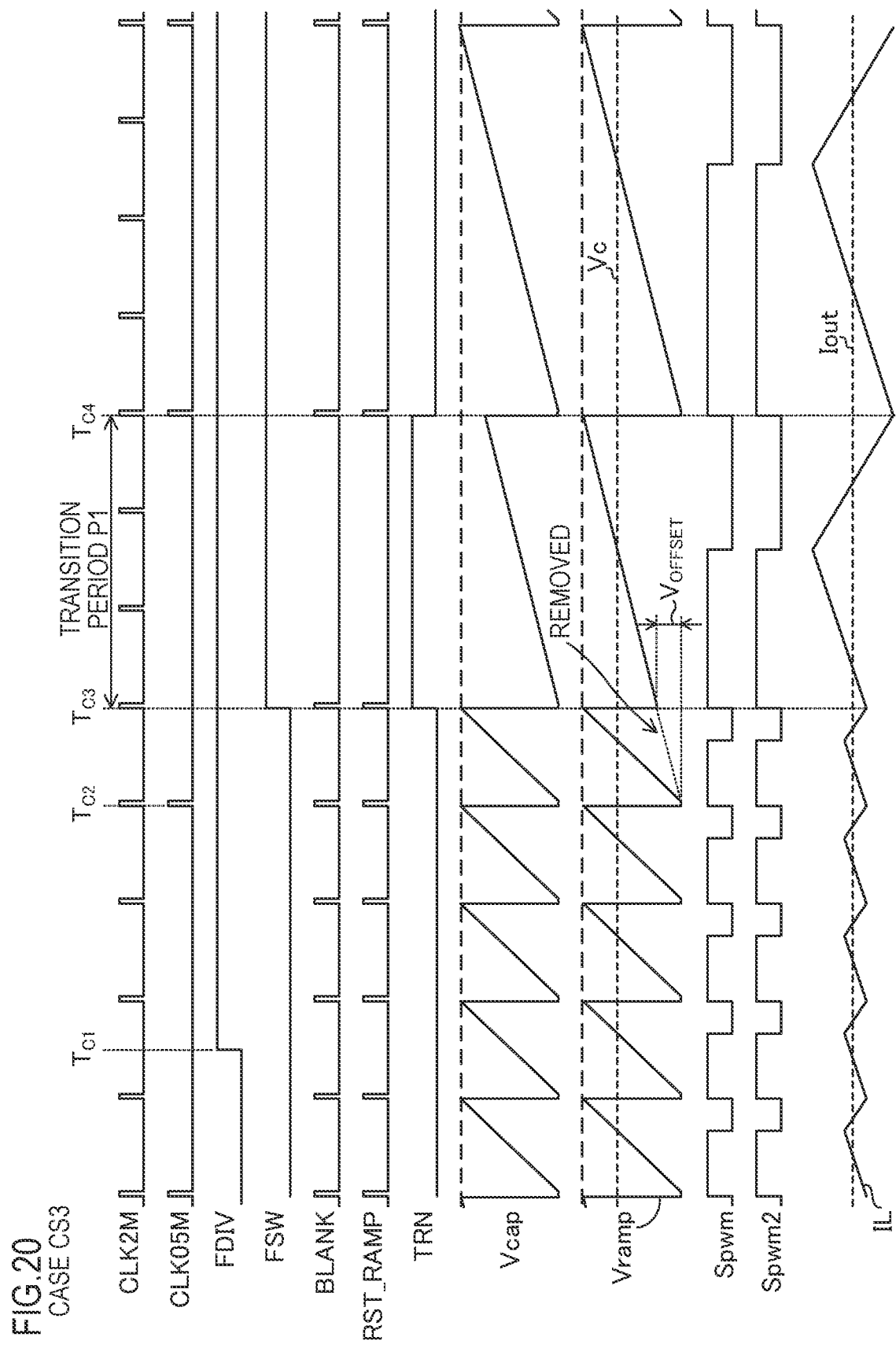
FIG. 20 is a diagram supplementarily illustrating a feature of the timing chart in FIG. 19.

As described above, during the transition period P1, the ramp voltage Vramp is given a waveform (see FIG. 20) as if, of the waveform that the ramp voltage Vramp has with the switching frequency at the frequency $f_{05M}$, the part corresponding the first one-fourth of the period is removed. Thus, it is possible to obtain a waveform as shown in FIG. 11 in the coil current IL when the switching frequency is switched from the frequency $f_{2M}$ to the frequency $f_{05M}$, and to suppress undesirable variation of the output voltage Vout during switching frequency switching.

Incidentally, the current source 116a can make the ramp current Ir proportional to the input voltage Vin by performing voltage-current conversion on the input voltage Vin. Here, a V-I conversion resistor (not illustrated) provided for voltage-current conversion in the current source 116a and the resistor 116b can be configured as resistors of the same type with identical electrical characteristics. The electrical characteristics here at least include temperature characteristics (temperature coefficient). It is thus possible to suppress deviation of the offset voltage $V_{OFFSET}$ from the ideal value due to variation of the temperature of the switching power supply IC 2A.

Figure 21:
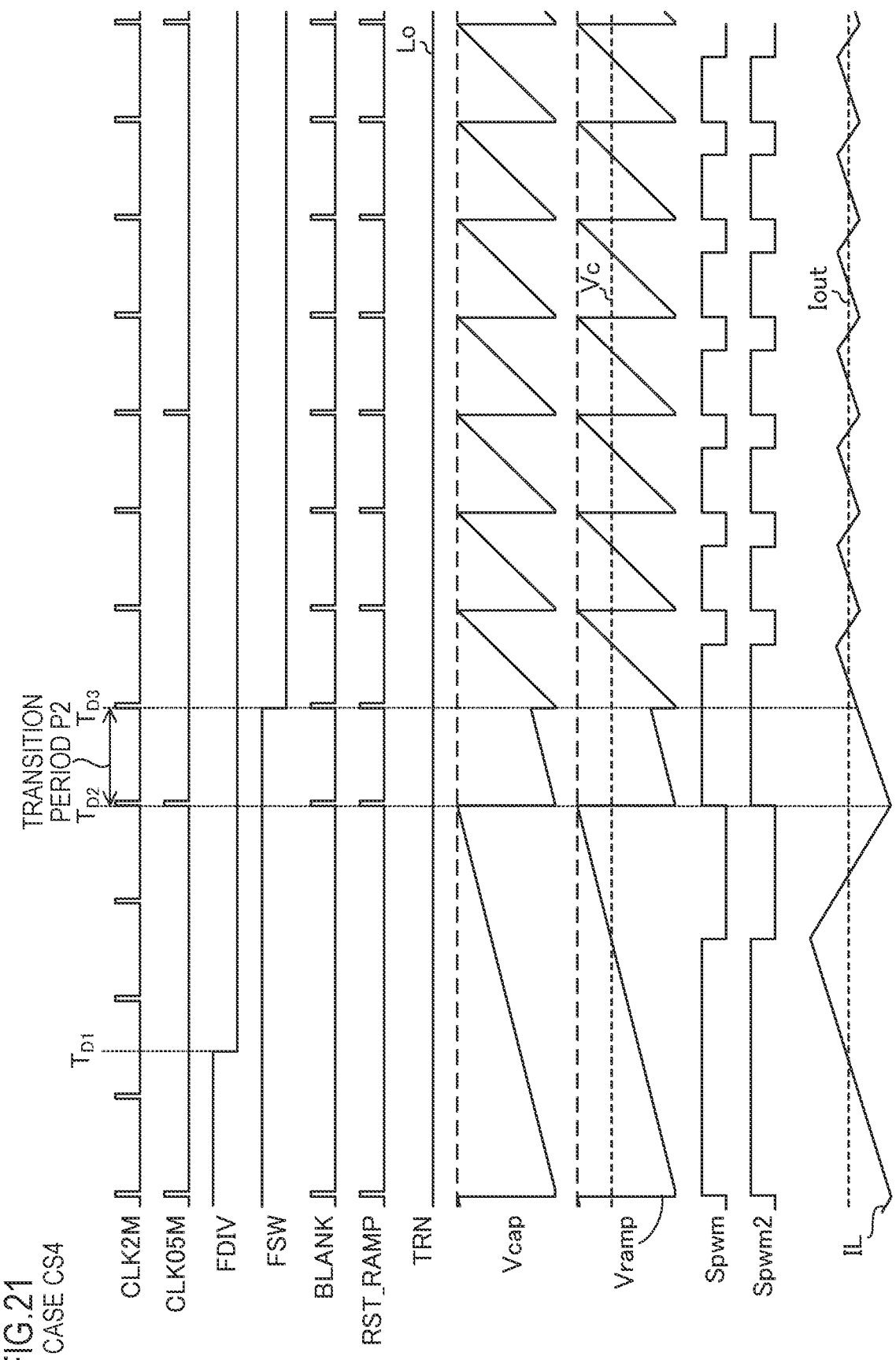
FIG. 21 is a timing chart of the switching power supply device according to the first embodiment of the present disclosure (Case CS4)

FIG. 21 is a timing chart obtained in Case CS4 where the switching frequency undergoes a switch from the frequency $f_{05M}$ to the frequency $f_{2M}$. Referring to FIG. 21, a description will be given of the operation of the switching power supply device 1A in Case CS4. FIG. 21 shows, from top to bottom, with solid lines, the waveforms of the signal CLK2M, the signal CLK05M, the signal FDIV, the signal FSW, the signal BLANK, the signal RST_RAMP, the signal TRN, the voltage Vcap, the voltage Vramp, the signal Spwm, the signal Spwm2, and the current IL. FIG. 21 also shows, along with the waveform (solid line) of the ramp voltage Vramp, the waveform of the comparison voltage Vc with a broken line and, along with the waveform (solid line) of the coil current IL, the waveform of the output current Iout with a broken line. In FIG. 21, it is assumed that the comparison voltage Vc and the output current Iout are constant. Suppose that, as time passes, timings $T_{D1}$, $T_{D2}$, $T_{D3}$, and $T_{D4}$ occur in this order.

In Case CS4, before timing $T_{D1}$, the frequency switch signal FDIV is kept at high level, and thus, before timing $T_{D1}$, operation proceeds in a similar manner as in Case CS2 in FIG. 18. In Case CS4, suppose that, at timing $T_{D1}$, the signal FDIV turns from high level to low level and that, after timing $T_{D1}$, the signal FDIV is kept at low level.

When at timing $T_{D1}$ a down edge occurs in the signal FDIV, then at timing $T_{D2}$, a low-level signal FDIV is acquired by the FF 121a (see FIG. 16A), and then at timing $T_{D3}$ a down edge occurs in the signal FSW. Timing $T_{D2}$ is the up-edge timing of the clock signal CLK05M that occurs after and is closest to timing $T_{D1}$. Timing $T_{D3}$ is the next up-edge timing of the clock signal CLK2M after timing $T_{D2}$. Thus, the time difference between timings $T_{D2}$ and $T_{D3}$ is equal to the reciprocal of the frequency $f_{2M}$. The time period between timings $T_{D2}$ and $T_{D3}$ will be referred to as the transition period P2. Timing $T_{D2}$ corresponds to timing $T_{A1}$ in FIGS. 10 and 12, and timing $T_{D3}$ corresponds to timing $T_{A2}$ in FIGS. 10 and 12. In Case CS4, the signal TRN is kept at low level, and thus the switch SW1 is kept in the on state.

Since at timing $T_{D2}$ the signal FSW is at high level, when at timing $T_{D2}$ an up edge occurs in the clock signal CLK05M, an up edge occurs also in the signals BLANK and RST_RAMP. Starting at the down-edge timing $T_{D3}$ of the signal FSW, the controller 120 operates with the switching frequency set to the frequency $f_{2M}$. Accordingly, at timing $T_{D3}$, in synchronization with an up edge in the clock signal CLK2M, the signal generation circuit 122 in FIG. 15 produces an up edge in the signals BLANK and RST_RAMP.

The signal RST_RAMP, turned to high level at timing $T_{D2}$, discharges the electric charge accumulated in the capacitor 116c, so that the voltages Vcap and Vramp turn to a predetermined first initial voltage (here, 0 V) and, owing to the signal BLANK, now at high level, and the operation of the circuits identified by the reference signs 117 and 123 to 126, the signal Spwm2 turns to high level, so that the output stage circuit MM switches from low-output state to the high-output state.

In synchronization with the switch of the output stage circuit MM to the high-output state at timing $T_{D2}$ (more precisely, after the occurrence of a down edge in the signal RST_RAMP), owing to the ramp current Ir, the voltages Vcap and Vramp start to increase linearly starting at the predetermined first initial voltage. Since the signal FSW is at high level during transition period P2, the value of the ramp current Ir during the transition period P2 is equal to the current value $Ir_{05M}$ (the value of the ramp current Ir with the switching frequency set to the frequency $f_{05M}$). Accordingly, the gradients of variation of the voltages Vcap and Vramp during the transition period P2 are equal to the gradients of variation of the voltages Vcap and Vramp with the switching frequency set to frequency $f_{05M}$. Thus, immediately before the end of the transition period P2, the ramp voltage Vramp has a voltage value resulting from multiplying by ⅔ the amount of change of the ramp voltage Vramp (i.e., the amplitude of the ramp voltage Vramp) during one period with the switching frequency set to frequency $f_{05M}$.

On the other hand, as mentioned above, this embodiment assumes a configuration where the switching frequency is switched around a timing that the on-duty Don becomes equal to ⅔; thus, during the transition period P2, the comparison voltage Vc is expected to have a voltage value resulting from multiplying by approximately ⅔ the amount of change of the ramp voltage Vramp (i.e., the amplitude of the ramp voltage Vramp) during one period with the switching frequency set to the frequency $f_{05M}$. Accordingly, during the transition period P2, Vramp<Vc always holds, and the signals Spwm and Spwm2 are kept at high level.

At the timing of the end of the transition period P2, namely at timing $T_{D3}$, an up edge occurs in the signal RST_RAMP, so that the voltages Vcap and Vramp turn back to the predetermined first initial voltage (here, 0 V), and immediately thereafter (more precisely, after the occurrence of a down edge in the signal RST_RAMP), owing to the ramp current Ir, the voltages Vcap and Vramp restart increasing linearly starting at the predetermined first initial voltage. It should however be noted that, after timing $T_{D3}$, the value of the ramp current Ir is equal to the current value $Ir_{2M}$ (the value of the ramp current Ir with the switching frequency set to the frequency $f_{2M}$). Accordingly, the gradients of variation of the voltages Vcap and Vramp after the end of the transition period P2 are equal to the gradient of variation of the ramp voltage Vramp with the switching frequency set to frequency $f_{2M}$.

In Case CS4, at and after timing $T_{D4}$, the signal FSW is at low level, and thus operation proceeds as in Case CS1 in FIG. 17. However, since at the end of the transition period P2 the signals Spwm and Spwm2 are at high level, the output stage circuit MM is kept in the high-output state across timing $T_{D3}$. A configuration is also possible that additionally includes a circuit for preventing an up edge from occurring in the signal BLANK at timing $T_{D3}$ or a circuit for keeping the output stage circuit MM in the low-output state for a minute time immediately after timing $T_{D3}$. After timing $T_{D3}$, as the ramp voltage Vramp increases linearly, when a transition from Vramp<Vc to Vramp>Vc takes place, owing to the operation of the circuits identified by the reference signs 117 and 123 to 126, the signal Spwm2 turns to low level, so that the output stage circuit MM switches from the high-output state to the low-output state.

As described above, during the transition period P2, the output stage circuit MM is set to the high-output state and simultaneously the ramp voltage Vramp is made to start increasing linearly starting at the first initial voltage; thereafter, at the same time that the transition period P2 ends, the ramp voltage Vramp is turned back to the first input terminal and switching operation at the frequency $f_{2M}$ is started. Thus, when the switching frequency is switched from the frequency $f_{05M}$ to the frequency $f_{2M}$, during the transition period P2 the coil current IL increases and, starting with the coil current having so increased, switching operation at the frequency $f_{2M}$ is started. The increase in the coil current IL during the transition period P2 is equal to ΔIL3 in FIG. 10

(in other words, the switching power supply IC 2A is designed so as to achieve such behavior).

Thus, it is possible to obtain a waveform as shown in FIG. 12 in the coil current IL when the switching frequency is switched from the frequency $f_{05M}$ to the frequency $f_{2M}$, and to suppress undesirable variation of the output voltage Vout during switching frequency switching.

Second Embodiment

A second embodiment of the present disclosure will be described. The second embodiment deals with applied technologies and modified technologies that can be employed in the first embodiment. The second embodiment is an embodiment based on the first embodiment, and for any features that are not specifically mentioned in connection with the second embodiment, unless inconsistent, the description of those features given above in connection with the first embodiment applies to second embodiment as well. In interpreting the description of the second embodiment, for any features that contradict between the first and second embodiments, their description given in connection with the second embodiment may prevail. The second embodiment includes Practical Examples EX2_1 to EX2_7 described below that can be implemented in any combination.

Practical Example EX2_1

Figure 22:
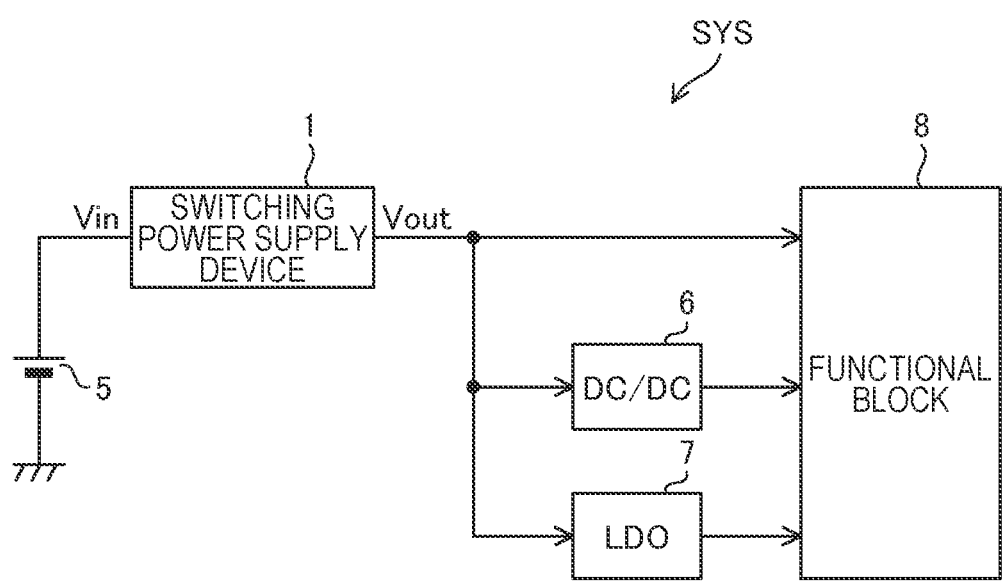
FIG. 22 is an overall configuration diagram of a system according to a second embodiment of the present disclosure.
Figure 23:
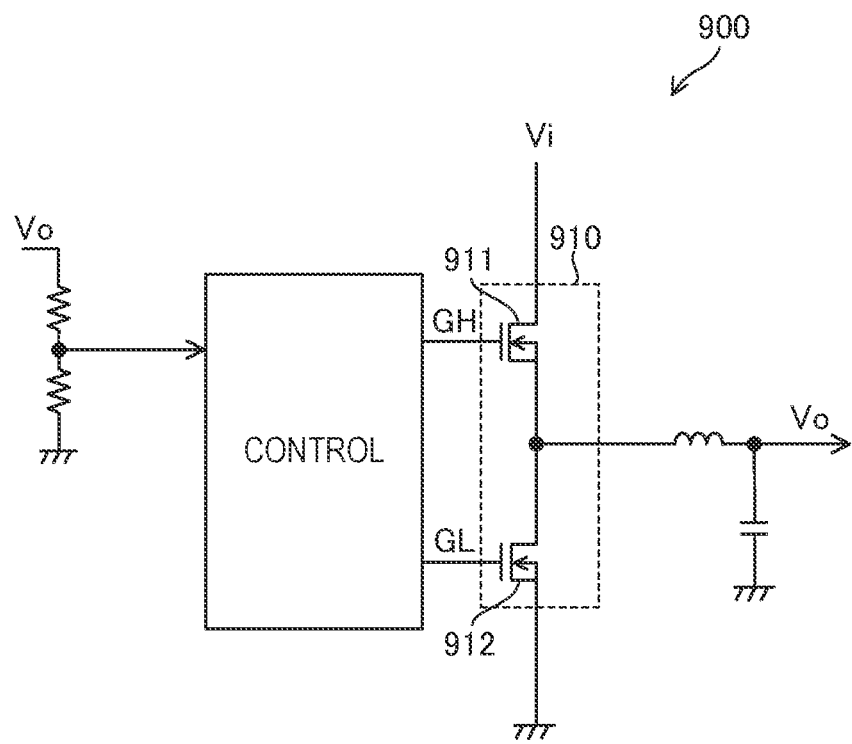
FIG. 23 is a configuration diagram of a switching power supply device according to a reference technology.
Figure 24:
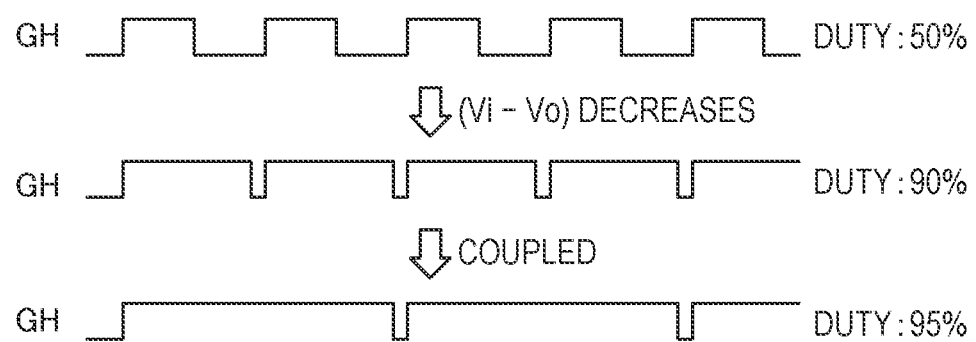
FIG. 24 is a diagram illustrating a reference method.

Practical Example EX2_1 will be described. FIG. 22 shows an overall configuration of a system SYS that incorporates a switching power supply device 1. The system SYS can be mounted on a vehicle such as an automobile, in which case the system SYS functions as a vehicle-mounted system. The switching power supply device 1 in the system SYS can be the switching power supply device 1A described above. The system SYS includes the switching power supply device 1 and a voltage source 5 that supplies the switching power supply device 1 with the input voltage Vin, as well as a DC-DC converter 6, an LDO (low drop-out) regulator 7, and a functional block 8 that each receives the output voltage Vout from the switching power supply device 1. The target voltage Vtg of the output voltage Vout is, for example, 5 V or 3.3 V. The DC-DC converter 6 may have the same configuration as the switching power supply device 1 (that is, the present disclosure may be applied to the DC-DC converter 6).

The voltage source 5 can be a battery mounted on the vehicle. The DC-DC converter 6 and the LDO regulator 7 each generate a desired direct-current voltage based on the output voltage Vout of the switching power supply device 1 and supply the generated direct-current voltage to the functional block 8. The functional block 8 includes one or more electronic devices that operate based on the output voltage Vout from the switching power supply device 1 or the direct-current voltage from the DC-DC converter 6 or the LDO regulator 7. In a case where the system SYS is a vehicle-mounted system, those electronic devices may be any electronic devices mounted on the vehicle, examples including components of a car navigation system, digital meters, an air bag system, various kinds of ECUs (electronic control units), sensors, and an advanced driving assistance system.

While a switching power supply device 1 for vehicle onboard applications has been described, the switching power supply device 1 may be used in any other applications; the switching power supply device 1 can be incorporated in any electronic devices.

Practical Example EX2_2

Practical Example EX2_2 will be described. The switching power supply IC 2 as illustratively implemented as the switching power supply IC 2A can switch the switching frequency between a predetermined first frequency and a second frequency lower than the first frequency. While in the first embodiment the first frequency is 2 MHz and the second frequency is 500 kHz, the first frequency may be other than 2 MHz and the second frequency may be other than 500 kHz. With a view to simplifying the control and configuration involved, it is preferable that the first frequency be an integer times the second frequency.

In the first embodiment, the first and second frequencies are in the ratio of 4:1; accordingly, the length of the transition period P1 is set to three times the reciprocal of the first frequency ($f_{2M}$), the length of the transition period P2 is set to one time the reciprocal of the first frequency ($f_{2M}$), and the predetermined coefficient k mentioned above is set to ¼. Also in configurations where the first and second frequencies are in a ratio other than 4:1, the lengths of the transition periods P1 and P2 and the predetermined coefficient k can be set appropriately according to the ratio between the first and second frequencies such that a waveform similar to that shown in FIGS. 11 and 12 is obtained in the coil current IL.

The IC 2 includes a clock signal generator that generates a first clock signal with the first frequency and a second clock signal with the second frequency. In the first embodiment, the clock signals CLK2M and CLK05M correspond to the first and second clock signals respectively, and the oscillator 118 corresponds to the clock signal generator. The first and second clock signals are preferably synchronous with each other, and the second clock signal is preferably produced by dividing the frequency of the first clock signal. The lengths of the transition periods P1 and P2 are preferably each set to an integer times the period of the first clock signal (i.e., an integer times the reciprocal of the first frequency), and this makes it easy to set those transition periods by using the first clock signal.

In a configuration where the first frequency is set to an integer times the second frequency, the first and second frequencies may be in any ratio. From the viewpoint of suppressing noise in the AM frequency band in vehicle onboard application, it is preferable that the first frequency be set to an integer of four or more times the second frequency.

Practical Example EX2_3

Practical Example EX2_3 will be described. The switching power supply IC 2A in FIG. 3 employs current mode control, and the differential amplifier 114 and the circuit (including the error amplifier 111, the phase compensator 112, and the current sensor 113) that generates the signal on which the comparison voltage Vc is based constitute a comparison voltage generator. The comparison voltage generator generates the comparison voltage Vc based on the feedback voltage Vfb commensurate with the output voltage Vout. The phase comparator 115 in FIG. 3 can also be understood to be one among the components of the comparison voltage generator.

However, so long as the comparison voltage Vc is generated based on the feedback voltage Vfb commensurate with the output voltage Vout, the switching power supply device 1 according to the present disclosure may be controlled in any manner. For example, from the switching power supply IC 2A in FIG. 3, the current sensor 113, the differential amplifier 114, and the phase comparator 115 may be omitted, in which case the voltage Verr on the wiring conductor WR1 may be fed as the comparison voltage Vc to the non-inverting input terminal of the comparator 117. In that case, the error amplifier 111 alone constitutes the comparison voltage generator (even then the phase compensator 112 may be understood to be one among the components of the comparison voltage generator).

Practical Example EX2_4

Practical Example EX2_4 will be described. In the switching power supply IC 2 (2A), the output voltage Vout may be fed directly to the feedback terminal FB, in which case the feedback voltage Vfb is the output voltage Vout itself. Even if the feedback voltage Vfb is the output voltage Vout itself, the feedback voltage Vfb is still a feedback voltage based on the output voltage Vout.

Practical Example EX2_5

Practical Example EX2_5 will be described. In the first embodiment, each circuit that operates in response to a digital signal performs predetermined operation when trigged by an up edge in an input signal; instead, it may perform predetermined operation when trigged by a down edge in an input signal.

Practical Example EX2_6

Practical Example EX2_6 will be described. The ramp voltage Vramp changes linearly in a predetermined direction during the off-period of the switch SW2, and the predetermined direction is the increasing direction in the first embodiment. Instead, the predetermined direction may be the decreasing direction. In that case, modifications can be made to the switching power supply IC 2A that are necessary to make the ramp voltage Vramp change in the decreasing direction.

Practical Example EX2_7

Practical Example EX2_7 will be described.
The circuit elements of the switching power supply IC 2 are formed as semiconductor integrated circuits, and these semiconductor integrated circuits are sealed in a package made of resin to produce a semiconductor device. Instead, a plurality of discrete components may be used to form circuits equivalent to the circuits in the switching power supply IC 2. Some of the circuit elements described above as being included in the switching power supply IC 2 (e.g., the transistors M1 and M2) may be provided outside the switching power supply IC 2 and be externally connected it.

For any signal or voltage, the relationship between its high and low levels may be inverted so long as that can be done with no essential deviation from what has been described above.

The transistor M1 may be configured as a P-channel MOSFET, in which case, to perform the switching operation described above, the voltage level that is fed to the gate of the transistor M1 is modified from what is described above. In general, the channel type of any FET may be modified as desired.

Any of the transistors mentioned above may be of any type. For example, any of the transistors mentioned above as a MOSFET may be replaced with a junction FET, an IGBT (insulated-gate bipolar transistor), or a bipolar transistor. Any transistor has a first electrode, a second electrode, and a control electrode. In an FET, of the first and second electrodes one is the drain and the other is the source, and the control electrode is the gate. In an IGBT, of the first and second electrodes one is the collector and the other is the emitter, and the control electrode is the gate. In a bipolar transistor that is not classified as an IGBT, of the first and second electrodes one is the collector and the other is the emitter, and the control electrode is the base.

Overview of the Present Disclosure

To follow is an overview of the present disclosure as implemented in the embodiments described above.

According to one aspect of the present disclosure, a buck switching power supply device (1, 1A) includes: an output stage circuit (MM) including an output transistor (M1) between an application terminal for an input voltage (Vin) and a predetermined switching terminal (SW) and a rectification element (M2) between the switching terminal and a reference potential point at a predetermined reference potential; and a main control circuit (3, 3A) configured to generate an output voltage (Vout) by making the output stage circuit perform switching operation at a predetermined switching frequency. A coil (L1) is provided between the switching terminal and an application terminal for the output voltage, and an output capacitor (C1) is provided between the application terminal for the output voltage and the reference potential point. The main control circuit includes: a comparison voltage generator (111 to 115) configured to generate a comparison voltage (Vc) based on a feedback voltage (Vfb) commensurate with the output voltage; a ramp voltage generator (116) configured to generate a ramp voltage (Vramp) of which the voltage value changes linearly in a predetermined direction during each period at the switching frequency; a PWM comparator (117) configured to compare the comparison voltage with the ramp voltage to output a signal (Spwm) indicating the result of comparison; and a controller (120) configured to control the state of the output stage circuit based on the output signal of the PWM comparator. In each period at the switching frequency, the controller turns on the output transistor and the ramp voltage generator makes the ramp voltage start to change in the predetermined direction (e.g., in the increasing direction) starting at a predetermined first initial voltage, and thereafter, when the ramp voltage changes until a reversal occurs in the magnitude relationship between the ramp voltage and the comparison voltage, the controller turns off the output transistor (see FIGS. 17, 18). The main control circuit can switch the switching frequency between a predetermined first frequency ($f_{2M}$) and a second frequency ($f_{O5M}$) lower than the first frequency. When switching the switching frequency from the first frequency to the second frequency, the main control circuit sets a transition period (P1) shorter than the reciprocal of the second frequency and switches the switching frequency to the second frequency after the lapse of the transition period. In the transition period, the controller turns on the output transistor and the ramp voltage generator makes the ramp voltage start to change in the predetermined direction starting at a second initial voltage (first initial voltage+$V_{OFFSET}$) further in the predetermined direction than the first initial voltage, and thereafter, when the ramp voltage changes until a reversal occurs in the magnitude relationship between the ramp voltage and the comparison voltage, the controller turns off the output transistor (see FIG. 19).

For another example, in the above-described switching power supply device according to one aspect of the present disclosure, when switching the switching frequency from the second frequency to the first frequency, the main control circuit may set a second transition period (P2) shorter than the reciprocal of the second frequency, and may switch the switching frequency to the first frequency after the lapse of the second transition period (see FIG. 21). Here, in the second transition period, the controller may turn on the output transistor and the ramp voltage generator may make the ramp voltage start to change in the predetermined direction starting at the first initial voltage (see timing $T_{D2}$), and thereafter, simultaneously with the end of the second transition period, the main control circuit may turn the ramp voltage back to the first initial voltage to start switching operation at the second frequency (see timing $T_{D3}$).

Embodiments of the present disclosure can be modified in many ways as necessary without departure from the scope of the technical concepts defined in the appended claims. The embodiments described herein are merely examples of how the present disclosure can be implemented, and what is meant by any of the terms used to describe the present disclosure and its constituent elements is not limited to that mentioned in connection with the embodiments. The specific values mentioned in the above description are merely illustrative and needless to say can be modified to different values.

The invention claimed is:

1. A buck switching power supply device comprising:
an output stage circuit including:
an output transistor between an application terminal for an input voltage and a predetermined switching terminal; and
a rectification element between the switching terminal and a reference potential point at a predetermined reference potential; and
a main control circuit configured to generate an output voltage by making the output stage circuit perform switching operation at a predetermined switching frequency,
wherein
a coil is provided between the switching terminal and an application terminal for the output voltage,
an output capacitor is provided between the application terminal for the output voltage and the reference potential point,
the main control circuit includes:
a comparison voltage generator configured to generate a comparison voltage based on a feedback voltage commensurate with the output voltage;
a ramp voltage generator configured to generate a ramp voltage of which a voltage value changes linearly in a predetermined direction during each period at the switching frequency;
a PWM comparator configured to compare the comparison voltage with the ramp voltage to output a signal indicating a result of comparison; and
a controller configured to control a state of the output stage circuit based on an output signal of the PWM comparator,
in each period at the switching frequency, the controller turns on the output transistor and the ramp voltage generator makes the ramp voltage start to change in the predetermined direction starting at a predetermined first initial voltage, and thereafter, when the ramp voltage changes until a reversal occurs in a magnitude relationship between the ramp voltage and the comparison voltage, the controller turns off the output transistor,
the main control circuit can switch the switching frequency between a predetermined first frequency and a second frequency lower than the first frequency, and when switching the switching frequency from the first frequency to the second frequency, the main control circuit sets a transition period shorter than a reciprocal of the second frequency and switches the switching frequency to the second frequency after a lapse of the transition period,
in the transition period, the controller turns on the output transistor and the ramp voltage generator makes the ramp voltage start to change in the predetermined direction starting at a second initial voltage further in the predetermined direction than the first initial voltage, and thereafter, when the ramp voltage changes until a reversal occurs in the magnitude relationship between the ramp voltage and the comparison voltage, the controller turns off the output transistor.

2. The switching power supply device according to claim 1, wherein
a gradient of change of the ramp voltage is proportional to the switching frequency,
the gradient of change of the ramp voltage during the transition period is equal to the gradient of change of the ramp voltage with the switching frequency set to the second frequency,
an offset voltage, which is a difference between the first and second initial voltages, corresponds to a voltage resulting from multiplying by a predetermined coefficient less than one an amount of change of the ramp voltage during one period with the switching frequency set to the second frequency.

3. The switching power supply device according to claim 2, wherein
the predetermined coefficient is determined according to a ratio between the first and second frequencies.

4. The switching power supply device according to claim 2, wherein
the ramp voltage generator includes:
a ramp node at which the ramp voltage appears;
a current source configured to generate a ramp current;
a ramp capacitor configured to receive the ramp current to store electric charge attributable thereto during each period at the switching frequency;
an offset resistor between the ramp capacitor and the ramp node; and
a short-circuiting switch in parallel with the offset resistor,
a terminal-to-terminal voltage across the ramp capacitor is set to the first initial voltage
at a timing of a start of each period at the switching frequency and
at a timing of a start of the transition period, and
the short-circuiting switch is off only during the transition period, and turning off the short-circuiting switch results in the offset voltage appearing across the offset resistor.

5. The switching power supply device according to claim 4, wherein
the ramp current is proportional to the switching frequency, and a value of the ramp current during the transition period is equal to the value of the ramp current with the switching frequency set to the second frequency.

6. The switching power supply device according to claim 1, wherein
the main control circuit further includes:
a clock signal generator configured to generate a first clock signal at the first frequency and a second clock signal at the second frequency that are synchronous with each other,
the main control circuit makes the output stage circuit perform switching operation in synchronization with the first or second clock signal to make the switching frequency the first or second frequency respectively, and sets a length of the transition period to an integer times a period of the first clock signal.

7. The switching power supply device according to claim 1, wherein
when switching the switching frequency from the second frequency to the first frequency, the main control circuit sets a second transition period shorter than a reciprocal of the second frequency and switches the switching frequency to the first frequency after a lapse of the second transition period,
in the second transition period, the controller turns on the output transistor and the ramp voltage generator makes the ramp voltage start to change in the predetermined direction starting at the first initial voltage, and thereafter, simultaneously with an end of the second transition period, the main control circuit turns the ramp voltage back to the first initial voltage to start switching operation at the second frequency.

8. The switching power supply device according to claim 7, wherein
when the switching frequency is switched from the second frequency to the first frequency, a coil current through the coil increases during the second transition period, and starting at the coil current so increased, switching operation at the second frequency is started.

9. The switching power supply device according to claim 1, wherein
the main control circuit sets the switching frequency based on a ratio of the output voltage to the input voltage.

10. The switching power supply device according to claim 9, wherein
while the main control circuit is performing switching operation at the first frequency,
when the ratio of the output voltage to the input voltage changes from lower to higher than a predetermined first threshold value, the main control circuit switches the switching frequency from the first frequency to the second frequency and thereafter,
when the ratio of the output voltage to the input voltage changes from higher to lower than a predetermined second threshold value, the main control circuit switches the switching frequency from the second frequency to the first frequency, and
the second threshold value is lower than the first threshold value.

11. The switching power supply device according to claim 1, wherein
the first frequency is an integer times the second frequency.

12. The switching power supply device according to claim 1, wherein
the first frequency is four times the second frequency, and
a length of the transition period is three times a reciprocal of the first frequency.

13. The switching power supply device according to claim 7, wherein
the first frequency is four times the second frequency,
a length of the transition period is three times a reciprocal of the first frequency, and
a length of the second transition period is equal to the reciprocal of the first frequency.

14. The switching power supply device according to claim 1, wherein
the rectification element is a synchronous rectification transistor, and
in switching operation of the output stage circuit, the output transistor and the synchronous rectification transistor are turned on and off alternately.

* * * * *